United States Patent
Yu et al.

(10) Patent No.: US 7,139,332 B2
(45) Date of Patent: Nov. 21, 2006

(54) QUADRATURE RECEIVER SAMPLING ARCHITECTURE

(75) Inventors: Tommy Yu, Orange, CA (US); Steven Jaffe, Irvine, CA (US); Stephen Edward Krafft, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 733 days.

(21) Appl. No.: 10/184,766

(22) Filed: Jun. 28, 2002

(65) Prior Publication Data

US 2003/0215027 A1    Nov. 20, 2003

Related U.S. Application Data

(60) Provisional application No. 60/381,496, filed on May 17, 2002, provisional application No. 60/381,497, filed on May 17, 2002.

(51) Int. Cl.
*H03K 9/00* (2006.01)
*H04L 27/06* (2006.01)
*H04L 27/14* (2006.01)
*H04L 27/22* (2006.01)

(52) U.S. Cl. ............ 375/316; 375/350; 455/3.02

(58) Field of Classification Search ........ 375/220, 375/316, 340, 350, 285; 455/3.01, 3.02, 455/141; 708/313
See application file for complete search history.

(56) References Cited

U.S. PATENT DOCUMENTS

| 5,212,764 | A  | * | 5/1993  | Ariyoshi ............... 704/233 |
| 5,506,862 | A  | * | 4/1996  | McIntosh ............... 375/130 |
| 5,550,869 | A  | * | 8/1996  | Gurantz et al. ........... 375/340 |
| 6,329,939 | B1 | * | 12/2001 | Swaminathan et al. ...... 341/143 |
| 2003/0142639 | A1 | * | 7/2003 | Cheung et al. ........... 370/321 |
| 2003/0186666 | A1 | * | 10/2003 | Sindhushayana ......... 455/260 |
| 2005/0114904 | A1 | * | 5/2005 | Monk et al. ............. 725/118 |

* cited by examiner

*Primary Examiner*—Jean B. Corrielus
(74) *Attorney, Agent, or Firm*—Garlick Harrison & Markison; Shayne X. Short; Kevin L. Smith

(57) ABSTRACT

Quadrature receiver sampling architecture. A signal ADC performs analog to digital conversion for both I and Q streams. An analog MUX selects the appropriate I and the Q baseband analog input streams for input to the ADC at the appropriate time. A digital filter may also be employed to compensate for any introduced delay between the samples of the I and Q channel when seeking to recover the symbols that have been transmitted to a communication receiver that employs this quadrature receiver architecture and/or signal processing. In one embodiment, if an ADC is clocked at a rate of substantially twice the sample rate of the I and Q channels, there will be a one-half sample clock delay between the digital I and digital Q data at the output of the ADC. This delay is then removed before the demodulator processes the input signals to recover the transmitted symbols.

27 Claims, 18 Drawing Sheets

QUADRATURE RECEIVER SAMPLING ARCHITECTURE

CROSS REFERENCE TO RELATED PATENTS/PATENT APPLICATIONS

The present U.S. Utility Patent Application claims priority pursuant to 35 U.S.C. § 119(e) to the following U.S. Provisional Patent Applications that are hereby incorporated herein by reference in their entirety and are made part of the present U.S. Patent Application for all purposes:

1. U.S. Provisional Patent Application Ser. No. 60/381, 496, entitled "SAMPLE RATE REDUCTION IN DATA COMMUNICATION RECEIVERS,", filed May 17, 2002.

2. U.S. Provisional Patent Application Ser. No. 60/381, 497, entitled "QUADRATURE RECEIVER SAMPLING ARCHITECTURE,", filed May 17, 2002.

The following U.S. Utility Patent Application, being filed concurrently, is hereby incorporated herein by reference in its entirety and made part of the present U.S. Utility Patent Application for all purposes:

1. U.S. Utility Patent Application Ser. No. 10/184,770, entitled "SAMPLE RATE REDUCTION IN DATA COMMUNICATION RECEIVERS,", filed Jun. 28, 2002, pending.

BACKGROUND OF THE INVENTION

1. Technical Field of the Invention

The invention relates generally to communication systems; and, more particularly, it relates to data communication systems employing analog and digital components.

2. Description of Related Art

Data communication systems have been long been under development. One particular design direction has been the movement towards always faster operating devices within the communication system. Particularly within receivers employed within digital communication systems, the rate at which an analog to digital converter (ADC) can properly sample a received analog signal is of some critical consideration. In order to enable regeneration/re-synthesize a digitally sampled signal into the analog signal that has been actually received and sampled by the ADC, then the sampling rate of the ADC needs to be clocked at a frequency at least twice the highest frequency component in the analog received signal. This will enable that the entirety of the received signal, at least up the "highest frequency component" of interest will be able to perform accurate regeneration of the received signal.

Many data communication systems also employ signal processing that involves both an in-phase (I) component and a quadrature (Q) component carried on a common signal. These two components are typically extracted using some type of interface that extracts the I and Q streams and converts them down to a baseband frequency for analog to digital conversion using two separate ADCs, one for the I stream and one for the Q stream.

ADCs can prove to be very real estate consumptive components within semiconductor devices. Given their oftentimes large real estate consumption, the ADCs within a semiconductor device often also prove to be large consumers of power as well. In the typical implementation of employing two distinct ADCs, one for the I stream and one for the Q stream, the real estate consumption of the ADCs can prove very large with respect to the total available area within an entire semiconductor device. In addition, any gradient or differential characteristics (mismatches) in the processing/manufacturing of the semiconductor device will potentially lead to different operating characteristics of the two ADCs. These differences may generate deleterious effects in the digital data that are generated by sampling the incoming I and Q analog data streams. This mismatch between the ADCs that perform the I and Q stream sampling may require some other corrective signal processing operations to accommodate these inconsistencies. These mismatches may become even more accentuated and problematic when employing higher order modulation schemes; the soft and hard bit decisions are even more blurred when the I and Q stream ADCs have mismatches between them.

Virtually any communication system having receivers that perform quadrature sampling of incoming data will employ the two ADC design, one ADC for the I stream and the Q stream. All of these potential deleterious effects may be realized in such a receiver device that employs this conventional design as described above.

Further limitations and disadvantages of conventional and traditional systems will become apparent through comparison of such systems with the invention as set forth in the remainder of the present application with reference to the drawings.

BRIEF SUMMARY OF THE INVENTION

Various aspects of the invention can be found in a quadrature receiver sampling architecture. The present invention is operable to perform analog to digital conversion of both an I and a Q data stream using a single ADC. Both the I and the Q baseband analog input streams are employed with an analog multiplexor (MUX) to select the appropriate input to the ADC at the appropriate time. The single ADC, while operating cooperatively with the MUX, is operable to perform selective digital sampling of the I and Q analog input streams. A digital filter may also be employed to compensate for any introduced delay between the samples of the I and Q channel when seeking to recover the symbols that have been transmitted to a communication receiver that employs the quadrature receiver architecture and/or signal processing according to the present invention. There are a variety of ways in which the operations may be performed using the present invention. For example, in one embodiment, if an ADC is clocked at a rate of twice the sample rate of the I and Q channels, there will be a one-half sample clock delay between the digital I and digital Q data at the output of the ADC. This delay is then removed before the demodulator processes the input signals and seeks to recover the transmitted symbols.

The present invention may be performed using one of at least two possible analog front-ends (AFEs) and one of at least two possible digital processing units (DPU). The DPU may include a digital signal processor (DSP) and/or additional digital circuitry as well. At least four different quadrature receiver sampling architectures may be realized according to the present invention. The various architectures for the AFE and DPU may be interchanged thereby generating even more possible configurations. The present invention provides for many advantages including reducing the real estate consumed by employing multiple ADCs for both in addition and Q streams, reducing cost, and/or reducing the possibility of mismatch errors between multiple ADCs. Any data communication receiver that performs quadrature data sampling may benefit from the arch and/or operations performed according to the present invention.

The above-referenced description of the summary of the invention captures some, but not all, of the various aspects of the present invention. The claims are directed to some other of the various other embodiments of the subject matter towards which the present invention is directed. In addition, other aspects, advantages and novel features of the invention will become apparent from the following detailed description of the invention when considered in conjunction with the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

The present invention is operable to perform analog to digital conversion of both an I and a Q data stream using a single ADC. Both the I and the Q baseband analog input streams are employed with an analog multiplexor (MUX) to select the appropriate input to the ADC at the appropriate time. The single ADC operates cooperatively with the MUX to perform selective digital sampling of the I and Q analog input streams. A digital filter may also be employed to compensate for any introduced delay between the samples of the I and Q channel when seeking to recover the symbols that have been transmitted to a communication receiver that employs the quadrature receiver architecture and/or signal processing according to the present invention. There are a variety of ways in which the operations may be performed using the present invention. For example, in one embodiment, if an ADC is clocked at a rate of twice the sample rate of the I and Q channels, there will be a one-half sample clock delay between the digital I and digital Q data at the output of the ADC. This delay is then removed before the demodulator processes the input signals and seeks to recover the transmitted symbols.

Figure 1A:
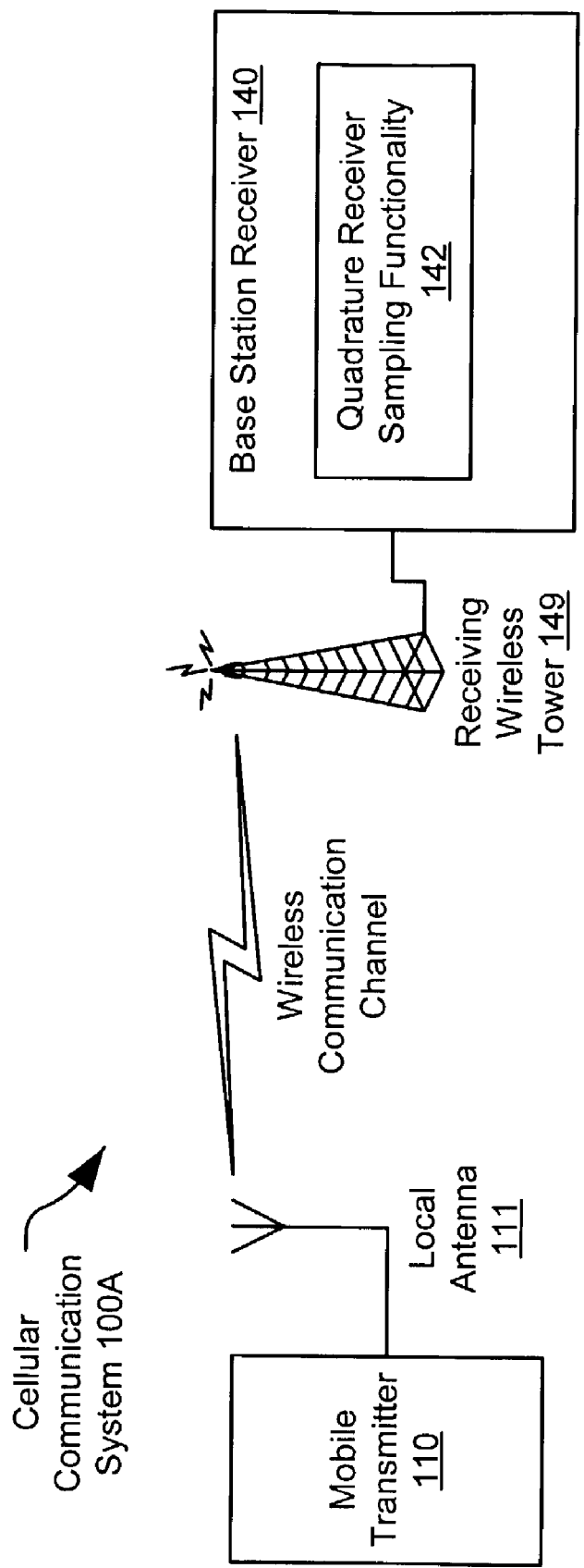
FIG. 1A is a system diagram illustrating an embodiment of a cellular communication system that is built according to the present invention.

FIG. 1A is a system diagram illustrating an embodiment of a cellular communication system 100A that is built according to the present invention. A mobile transmitter 110 has a local antenna 111. The mobile transmitter 110 may be any number of types of transmitters including a cellular telephone, a wireless pager unit, a mobile computer having transmit functionality, or any other type of mobile transmitter. The mobile transmitter 110 transmits a signal, using its local antenna 111, to a receiving wireless tower 149 via a wireless communication channel. The receiving wireless tower 149 is communicatively coupled to a base station receiver 140; the receiving wireless tower 149 is operable to receive data transmission from the local antenna 111 of the mobile transmitter 110 that have been communicated via the wireless communication channel. The receiving wireless tower 149 communicatively couples the received signal to the base station receiver 140.

The base station receiver 140 is operable to support quadrature receiver sampling functionality 142 that is performed according to the present invention. In certain embodiments, a single ADC is employed within the base station receiver 140 to perform the alternative selective digital sampling of both the I and the Q baseband analog input streams. There are a number of ways in which this quadrature sampling may be performed according to the present invention. The FIG. 1A shows just one of the many embodiments in which quadrature receiver sampling functionality, performed according to the present invention, may be supported within a communication receiver.

Figure 1B:
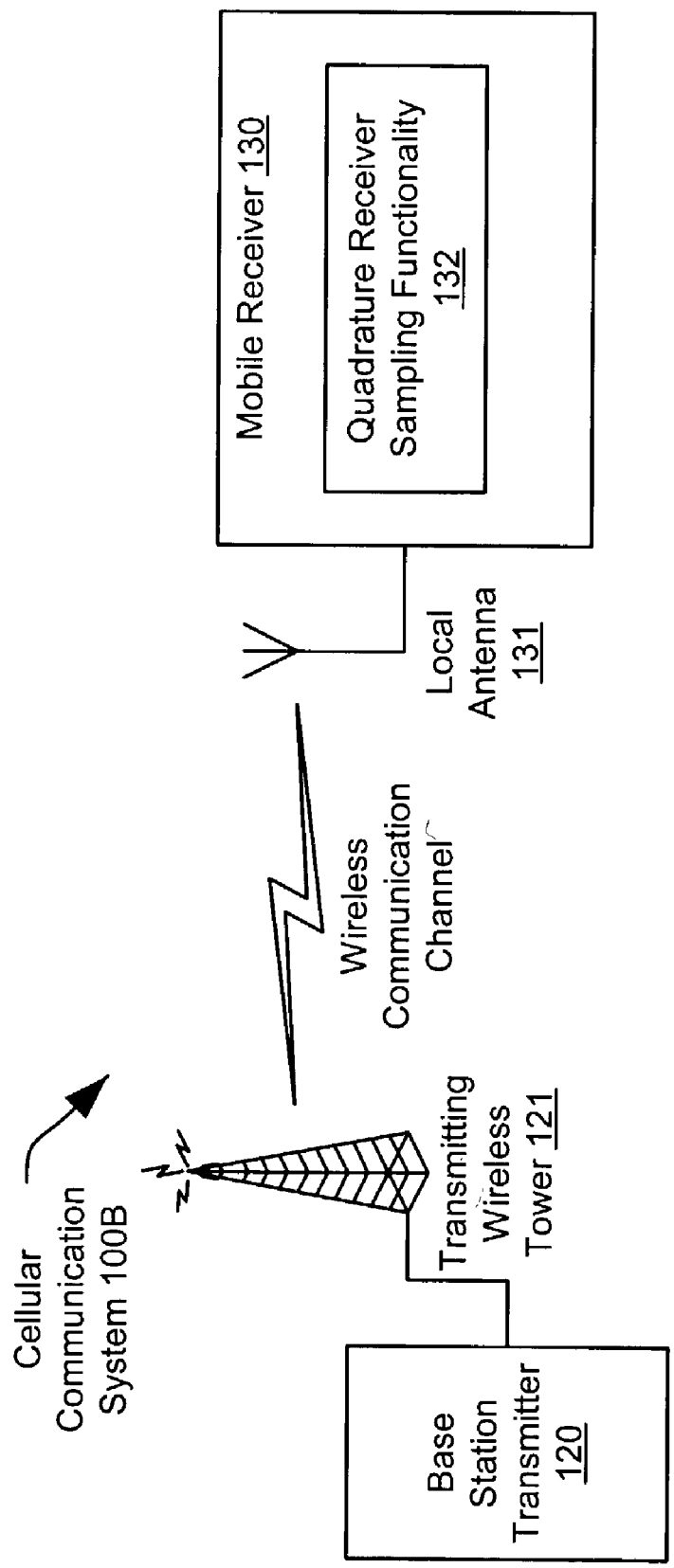
FIG. 1B is a system diagram illustrating another embodiment of a cellular communication system that is built according to the present invention.

FIG. 1B is a system diagram illustrating another embodiment of a cellular communication system 100B that is built according to the present invention. From certain perspectives, the FIG. 1B may be viewed as being the reverse transmission operation of the cellular communication system 100A of the FIG. 1A. A base station transmitter 120 is communicatively coupled to a transmitting wireless tower 121. The base station transmitter 120, using its transmitting wireless tower 121, transmits a signal to a local antenna 131 via a wireless communication channel. The local antenna 131 is communicatively coupled to a mobile receiver 130 so that the mobile receiver 130 is able to receive transmission from the transmitting wireless tower 121 of the base station transmitter 120 that have been communicated via the wireless communication channel. The local antenna 131 communicatively couples the received signal to the mobile receiver 130. It is noted that the mobile receiver 130 may be any number of types of receivers including a cellular telephone, a wireless pager unit, a mobile computer having receive functionality, or any other type of mobile receiver.

The mobile receiver 130 operable to support quadrature receiver sampling functionality 132 that is performed according to the present invention. In certain embodiments, a single ADC is employed within the mobile receiver 130 to perform the alternative selective digital sampling of both the I and the Q baseband analog input streams. There are a number of ways in which this quadrature sampling may be performed according to the present invention. The FIG. 1B shows yet another of the many embodiments in which quadrature receiver sampling functionality, performed according to the present invention, may be supported within a communication receiver.

Figure 2:
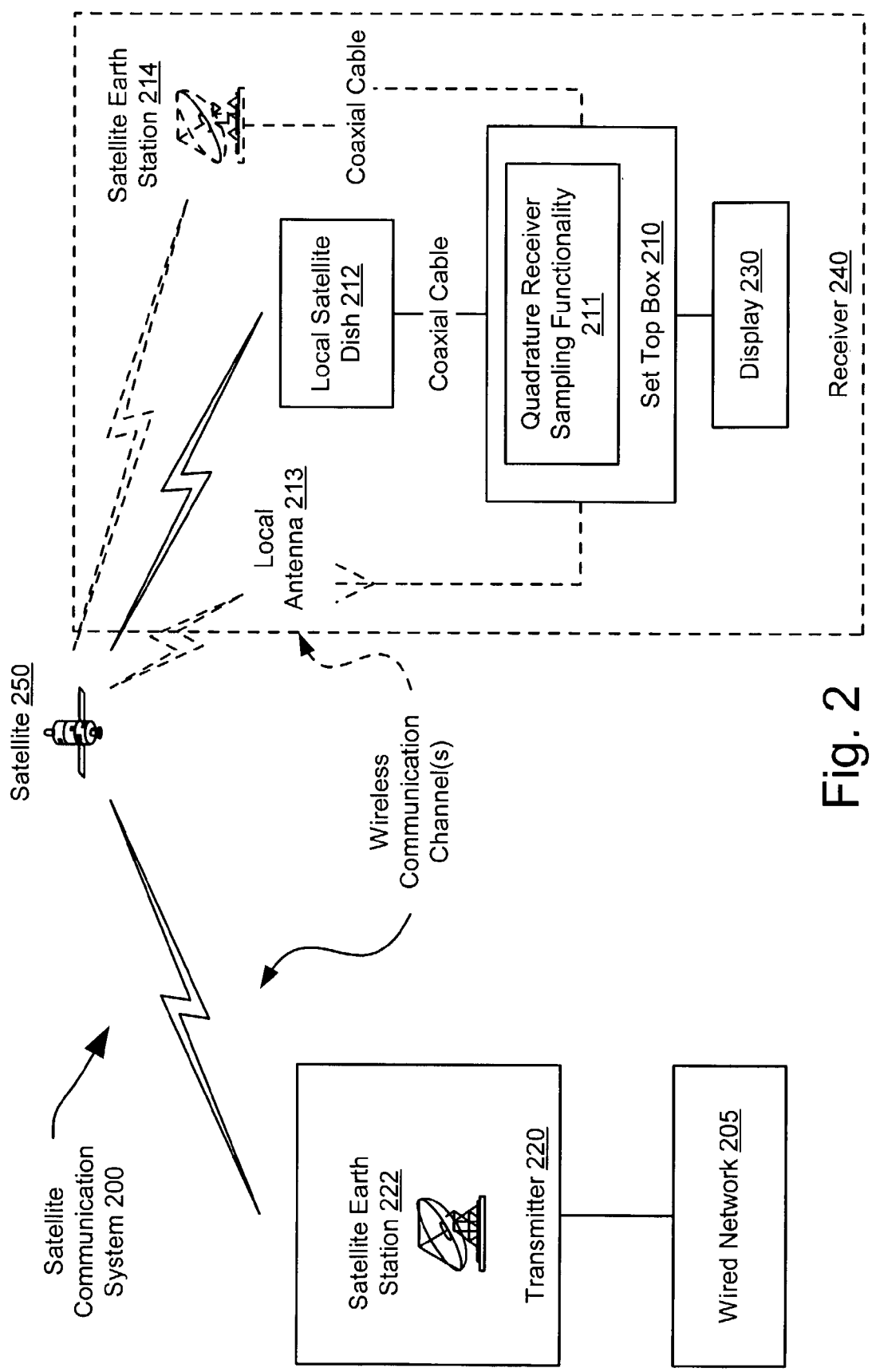
FIG. 2 is a system diagram illustrating an embodiment of a satellite communication system that is built according to the present invention.

FIG. 2 is a system diagram illustrating an embodiment of a satellite communication system 200 that is built according to the present invention. A transmitter 220 is communicatively coupled to a wired network 205. The wired network 205 may include any number of networks including the Internet, proprietary networks, and other wired networks. The transmitter 220 includes a satellite earth station 222 that is able to communicate to a satellite 250 via a wireless communication channel. The satellite 250 is able to communicate with a receiver 240. The receiver 240 may be a number of types of receivers, including terrestrial receivers such as satellite receivers, satellite based telephones, and satellite based Internet receivers.

In one embodiment, shown in the FIG. 2, the receiver 240 includes a local satellite dish 212. The local satellite dish 212 is used to communicatively couple a signal received from the satellite to a set top box 210. The set top box 210 may be any number of types of satellite interactive set top boxes; the set top box 210 may be an HDTV set top receiver or any other type of set top box without departing from the scope and spirit of the invention. Below within FIG. 4, a particular embodiment of an HDTV communication system is described. Moreover, in alternative embodiments, the satellite 250 is able to communicate with a local antenna 213 that communicatively couples to the set top box 210; in even other embodiments, the satellite 250 is able to communicate with a satellite earth station 214 that communicatively couples to the set top box 210.

Each of the local satellite dish 212, the local antenna 213, and the satellite earth station 214 is located on the earth. One of the local satellite dish 212, the local antenna 213, and the satellite earth station 214 is communicatively coupled to a set top box 210; the set top box 210 is operable to support quadrature receiver sampling functionality 211 that is performed according to the present invention. The set top box 210 is operable to performed receiver functionality for proper demodulation and decoding of a signal received from the satellite 250 and communicatively coupled to the set top box 210 via at least one of the local satellite dish 212, the local antenna 213, and the satellite earth station 214.

Here, the communication to and from the satellite 250 may cooperatively be viewed as being a wireless communication channel, or each of the communication to and from the satellite 250 may be viewed as being two distinct wireless communication channels. For example, the wireless communication "channel" may be viewed as including multiple wireless hops in one embodiment. In other embodiments, the satellite 250 receives a signal received from the satellite earth station 222, amplifies it, and relays it to one of the local satellite dish 212, the local antenna 213, and the satellite earth station 214. In the case where the satellite 250 receives a signal received from the satellite earth station 222, amplifies it, and relays it, the satellite 250 may be viewed as being a "transponder." In addition, other satellites may exist that perform both receiver and transmitter operations. In this case, each leg of an up-down transmission via the wireless communication channel would be considered separately. The wireless communication channel between the satellite 250 and a fixed earth station would likely be less time-varying than the wireless communication channel between the satellite 250 and a mobile station. In whichever of the local satellite dish 212, the local antenna 213, and the satellite earth station 214 is employed by the set top box 210 to receive the wireless communication from the satellite 250, the satellite 250 communicates with the set top box 210.

Again, set top box 210 is operable to support quadrature receiver sampling functionality 211 that is performed according to the present invention. In certain embodiments, a single ADC is employed within the set top box 210 to perform the alternative selective digital sampling of both the I and the Q baseband analog input streams. Again, as within the other embodiments as well, there are a number of ways in which this quadrature sampling may be performed according to the present invention. The FIG. 2 shows yet another of the many embodiments in which quadrature receiver sampling functionality, performed according to the present invention, may be supported within a communication receiver.

Figure 3A:
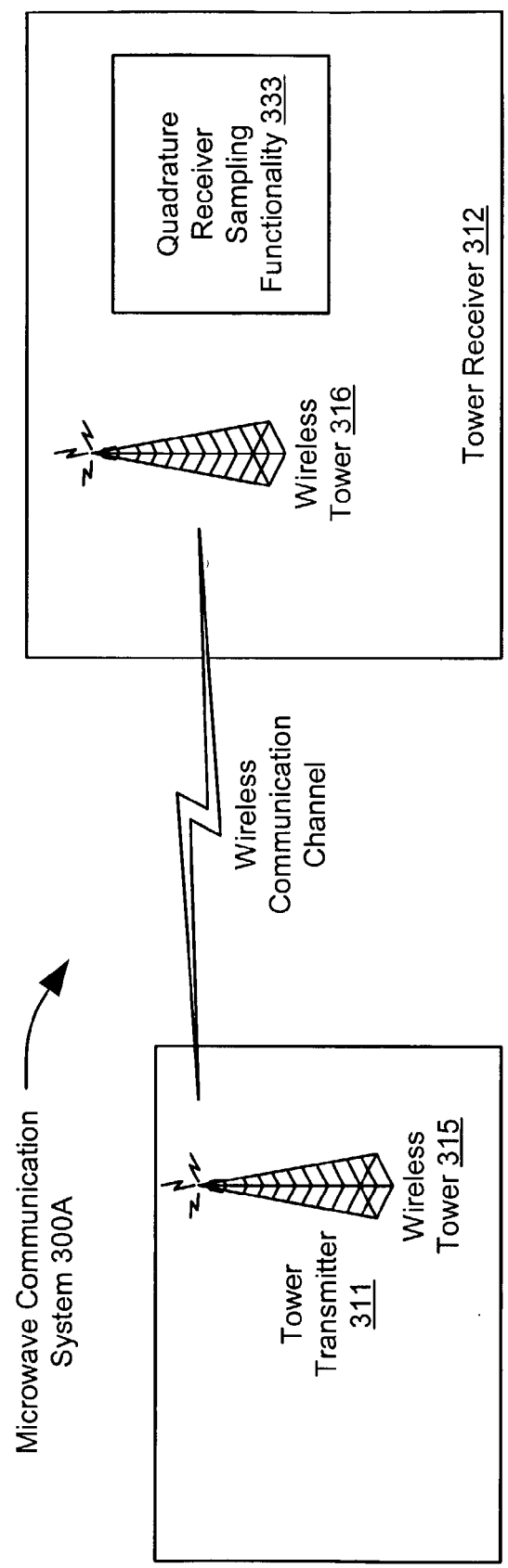
FIG. 3A is a system diagram illustrating an embodiment of a microwave communication system that is built according to the present invention.

FIG. 3A is a system diagram illustrating an embodiment of a microwave communication system 300A that is built according to the present invention. A tower transmitter 311 includes a wireless tower 315. The tower transmitter 311, using its wireless tower 315, transmits a signal to a tower receiver 312 via a wireless communication channel. The tower receiver 312 includes a wireless tower 316. The wireless tower 316 is able to receive transmissions from the wireless tower 315 that have been communicated via the wireless communication channel.

The tower receiver 312 is operable to support quadrature receiver sampling functionality 333 that is performed according to the present invention. In certain embodiments, a single ADC is employed within the tower receiver 312 to perform the alternative selective digital sampling of both the I and the Q baseband analog input streams. Again, there are a number of ways in which this quadrature sampling may be performed according to the present invention. The FIG. 3A shows yet another of the many embodiments in which quadrature receiver sampling functionality, performed according to the present invention, may be supported within a communication receiver.

Figure 3B:
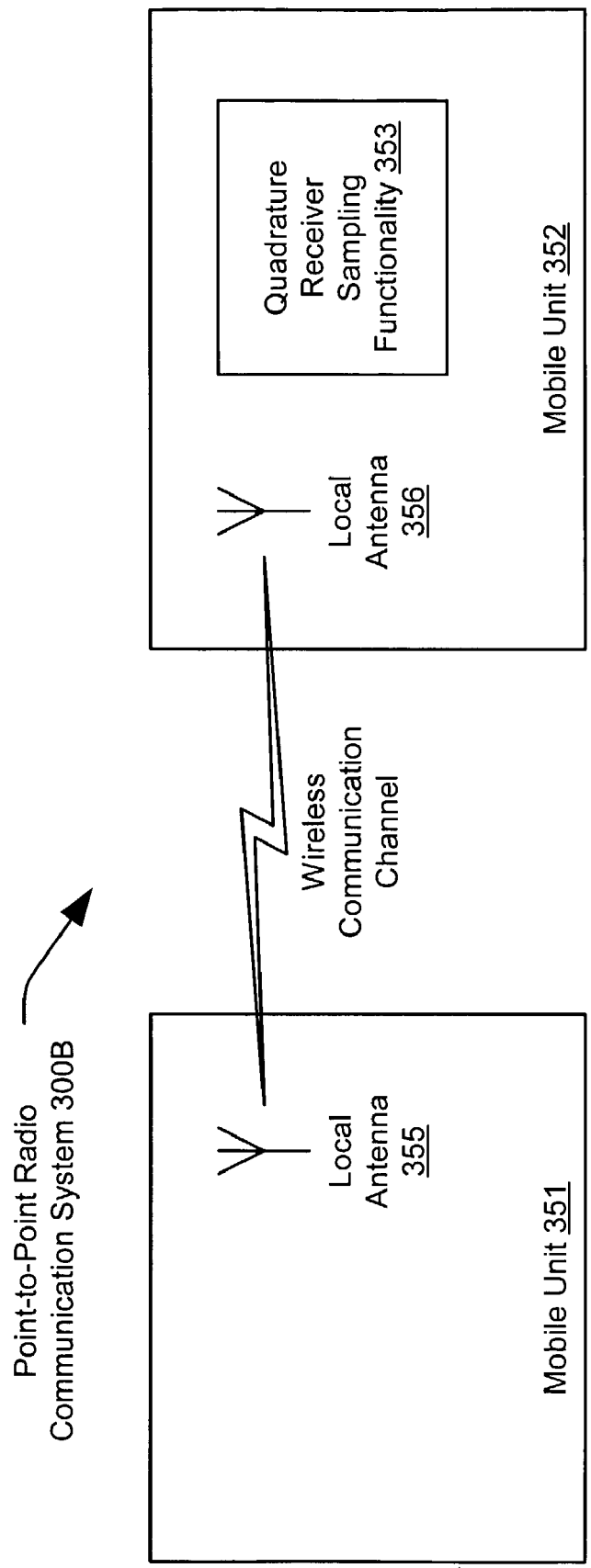
FIG. 3B is a system diagram illustrating an embodiment of a point-to-point radio communication system that is built according to the present invention.

FIG. 3B is a system diagram illustrating an embodiment of a point-to-point radio communication system 300B that is built according to the present invention. A mobile unit 351 includes a local antenna 355. The mobile unit 351, using its local antenna 355, transmits a signal to a local antenna 356 via a wireless communication channel. The local antenna 356 is included within a mobile unit 352. The mobile unit 352 is able to receive transmissions from the mobile unit 351 that have been communicated via the wireless communication channel.

The mobile unit 352 is operable to support quadrature receiver sampling functionality 353 that is performed according to the present invention. In certain embodiments, a single ADC is employed within the mobile unit 352 to perform the alternative selective digital sampling of both the I and the Q baseband analog input streams. Again, there are a number of ways in which this quadrature sampling may be performed according to the present invention. The FIG. 3B shows yet another of the many embodiments in which quadrature receiver sampling functionality, performed according to the present invention, may be supported within a communication receiver.

Figure 4:
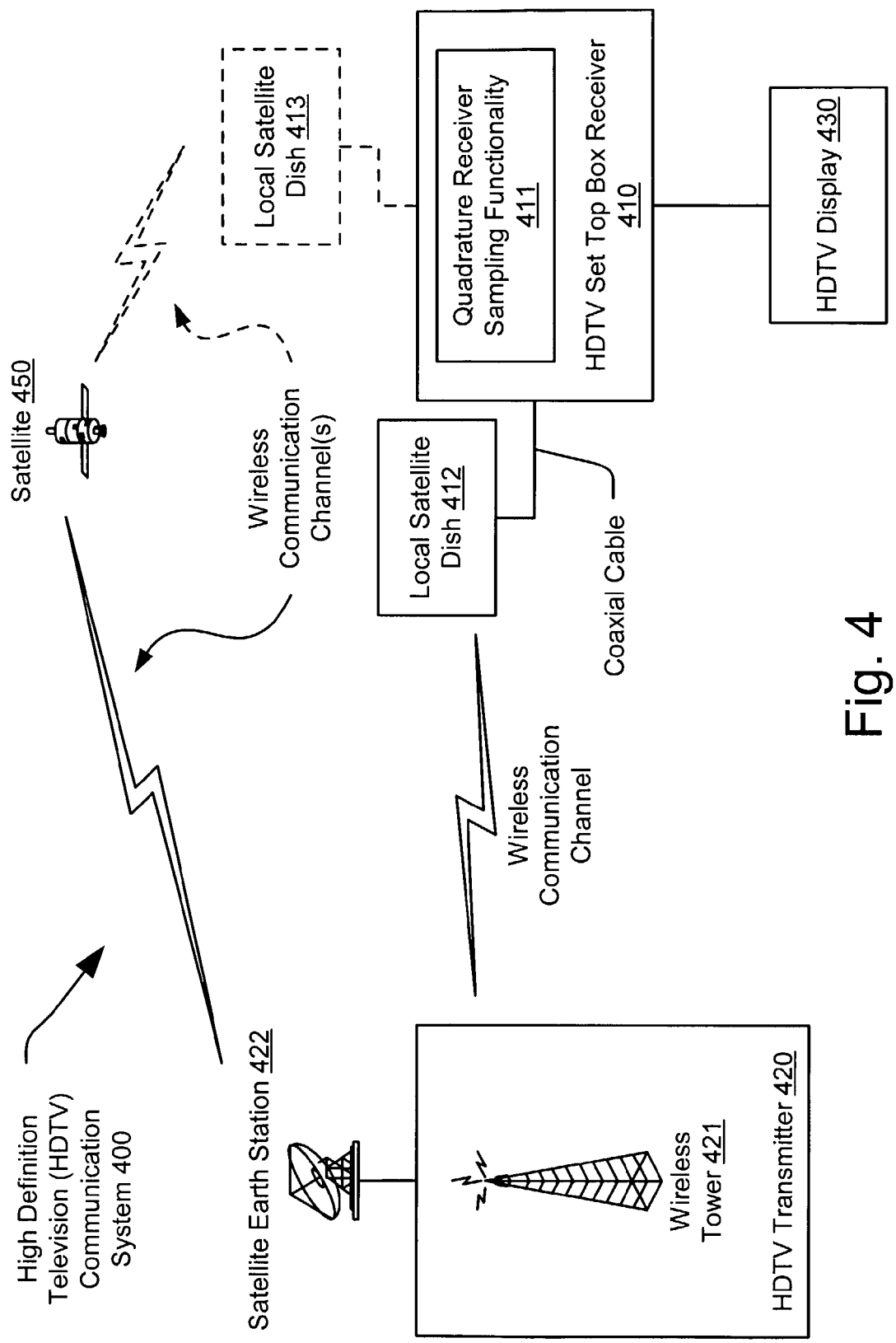
FIG. 4 is a system diagram illustrating an embodiment of a high definition television (HDTV) communication system that is built according to the present invention.

FIG. 4 is a system diagram illustrating an embodiment of a HDTV communication system 400 that is built according to the present invention. An HDTV transmitter 420 includes a wireless tower 421. The HDTV transmitter 420, using its wireless tower 421, transmits a signal to a local satellite dish 412 via a wireless communication channel. The local satellite dish 412 communicatively couples to an HDTV set top box receiver 410 via a coaxial cable. The HDTV set top box receiver 420 includes the functionality to receive the wireless transmitted signal. The HDTV set top box receiver 410 is also communicatively coupled to an HDTV display 430 that is able to display the demodulated and decoded wireless transmitted signals received by the HDTV set top box receiver 410. The HDTV transmitter 420 may transmit a signal directly to the local satellite dish 412 via the wireless communication channel. In alternative embodiments, the HDTV transmitter 420 may first receive a signal from a satellite 450, using a satellite earth station 422 that is communicatively coupled to the HDTV transmitter 420, and then transmit this received signal to the to the local satellite dish 412 via the wireless communication channel. In this situation, the HDTV transmitter 420 operates as a relaying element to transfer a signal originally provided by the satellite 450 that is destined for the HDTV set top box receiver 410. For example, another satellite earth station may first transmit a signal to the satellite 450 from another location, and the satellite 450 may relay this signal to the satellite earth station 422 that is communicatively coupled to the HDTV transmitter 420. The HDTV transmitter 420 performs receiver functionality and then transmits its received signal to the local satellite dish 412.

In even other embodiments, the HDTV transmitter 420 employs the satellite earth station 422 to communicate to the satellite 450 via a wireless communication channel. The satellite 450 is able to communicate with a local satellite dish 413; the local satellite dish 413 communicatively couples to the HDTV set top box receiver 410 via a coaxial cable. This path of transmission shows yet another communication path where the HDTV set top box receiver 410 may receive communication from the HDTV transmitter 420.

In whichever embodiment and whichever signal path the HDTV transmitter 420 employs to communicate with the HDTV set top box receiver 410, the HDTV set top box receiver 410 is operable to support quadrature receiver sampling functionality 411 that is performed according to the present invention. In certain embodiments, a single ADC is employed within the HDTV set top box receiver 410 to perform the alternative selective digital sampling of both the I and the Q baseband analog input streams. Again, there are a number of ways in which this quadrature sampling may be performed according to the present invention. The FIG. 4 shows yet another of the many embodiments in which quadrature receiver sampling functionality, performed according to the present invention, may be supported within a communication receiver.

Figure 5:
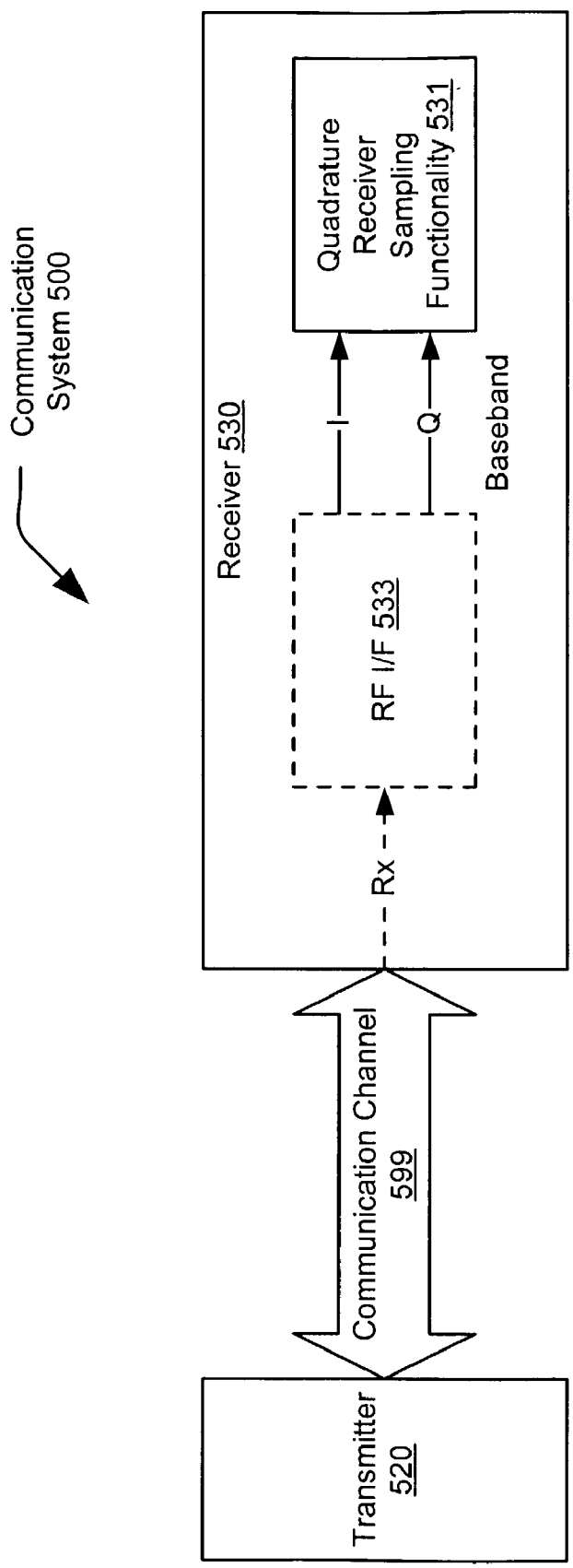
FIG. 5 is a system diagram illustrating an embodiment of a communication system that is built according to the present invention.

FIG. 5 is a system diagram illustrating an embodiment of a communication system 500 that is built according to the present invention. The FIG. 5 shows communicative coupling, via a communication channel 599, between a transmitter 520 and a receiver 530. The communication channel 599 may be a wireline communication channel or a wireless communication channel without departing from the scope and spirit of the invention.

The receiver 530 includes functionality to perform radio frequency interfacing (RF I/F) 533 to convert a received signal, received via the communication channel 599, down to a baseband frequency and to extract the I and Q data streams from the received signal. There a variety of ways to perform demodulation of a received signal down to baseband; for example, a received signal may be transformed into an intermediate frequency (IF) and then that IF may be transferred down to baseband. In doing so, the I and Q streams may then be extracted and provide to the functional block 531 that is operable to support quadrature receiver sampling functionality. If desired in even other embodiments, other transformations may be performed in down-converting a received signal to baseband and extracting the I and Q streams from the received signal.

However, regardless of the manner in which the I and Q streams are extracted from the signal received via the communication channel 599, these I and Q data streams are provided to a functional block 531 that is operable to support quadrature receiver sampling functionality that is performed according to the present invention. In certain embodiments, a single ADC is employed within the receiver 530 to perform the alternative selective digital sampling of both the I and the Q baseband analog input streams thereby supporting the quadrature receiver sampling functionality 531. Again, there are a number of ways in which this quadrature sampling may be performed according to the present invention. The FIG. 5 shows yet another of the many embodiments in which quadrature receiver sampling functionality, performed according to the present invention, may be supported within a communication receiver.

Figure 6:
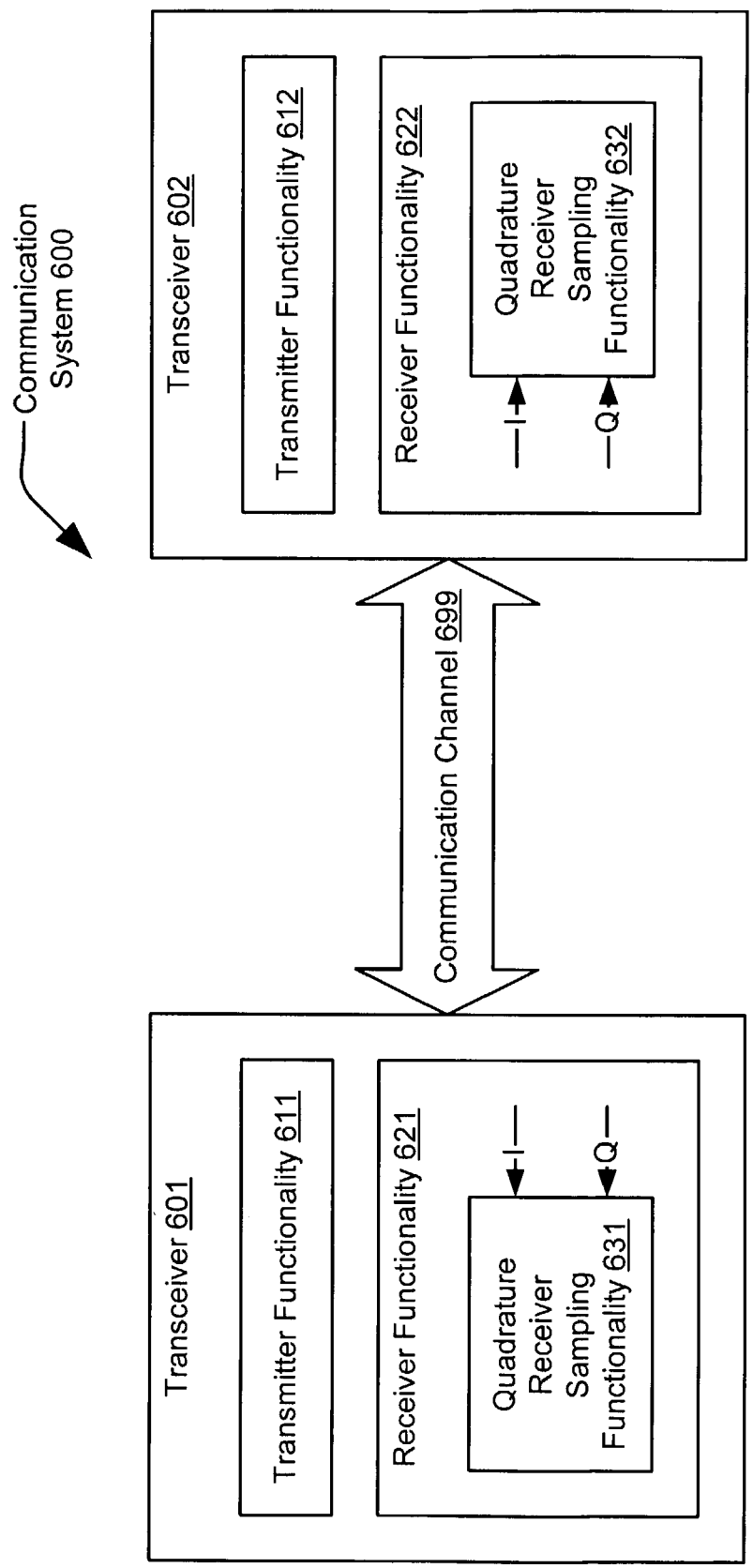
FIG. 6 is a system diagram illustrating another embodiment of a communication system that is built according to the present invention.

FIG. 6 is a system diagram illustrating an embodiment of a communication system 600 that is built according to the present invention. The FIG. 6 shows communicative coupling, via a communication channel 699, between two transceivers, a transceiver 601 and a transceiver 602. The communication channel 699 may be a wireline communication channel or a wireless communication channel without departing from the scope and spirit of the invention.

Each of the transceivers 601 and 602 includes transmitter functionality and receiver functionality. For example, the transceiver 601 includes transmitter functionality 611 and receiver functionality 621; the transceiver 602 includes transmitter functionality 612 and receiver functionality 622. The receiver functionalities 621 and 622, within the transceivers 601 and 602, respectively, are each operable to support quadrature receiver sampling functionality, 631 and 632, according to the present invention.

Each of the receiver functionalities 621 and 622 include functionality to extract I and Q data streams from signals received via the communication channel 699. The I and Q data streams may be generated from RF I/F that is operable to convert the received signals, received via the communication channel 699, down to the baseband frequency. Similar to the functionality described above for the RF I/F 533 shown in the FIG. 5, each of the receiver functionalities 621 and 622 in the FIG. 6 are operable to convert a received signal, received via the communication channel 699, down to a baseband frequency and to extract the I and Q data streams from the received signal. Again, there a variety of ways to perform demodulation of a received signal down to baseband; for example, a received signal may be transformed into an intermediate frequency (IF) and then that IF may be transferred down to baseband. In doing so, the I and Q streams may then be extracted and provided to the functional blocks 631 and 632 that are operable to support quadrature receiver sampling functionality. If desired in even other embodiments, other transformations may be performed in down-converting a received signal to baseband and extracting the I and Q streams from the received signal within the receiver functionalities 621 and 622.

However, regardless of the manner in which the I and Q streams are extracted from the signal received via the communication channel 699, they are provided to the receiver functionalities 621 and 622. Within the transceiver 601, these I and Q data streams are provided to the functional block 631 in the receiver functionality 621 that is operable to support quadrature receiver sampling functionality. Within the transceiver 602, these I and Q data streams are provided to the functional block 632 in the receiver functionality 622. The quadrature receiver functionalities 631 and 632 are each operable to support quadrature receiver sampling functionality that is performed according to the present invention. In certain embodiments, a single ADC is employed within the receiver functionality 621 and within the receiver functionality 622 to perform the alternative selective digital sampling of both the I and the Q baseband analog input streams thereby supporting the quadrature receiver sampling functionalities 631 and 632. Again, there are a number of ways in which this quadrature sampling may be performed according to the present invention. The FIG. 6 shows yet another of the many embodiments in which quadrature receiver sampling functionality, performed according to the present invention, may be supported within a communication receiver, or within the receiver functionality provided within a transceiver within a communication system as shown within the embodiment of the FIG. 6.

It is noted here that while many of the embodiments described within this patent application describe those communication systems employing wireless communication channels, the present invention is equally applicable within wireline communication systems without degrading any performance. There are certain embodiments where even landline systems may have a dynamically changing communication channel. While this is clearly the case in wireless communication applications (dynamically changing communication channel), it may also occur in wireline communication applications as well. The various types of communication systems described herein may be wireless communication applications in some embodiments; they may also be wireline communication applications in other embodiments; alternatively, they may include various network components that are wireline and some that are wireless all without departing from the scope and spirit of the invention.

Figure 7:
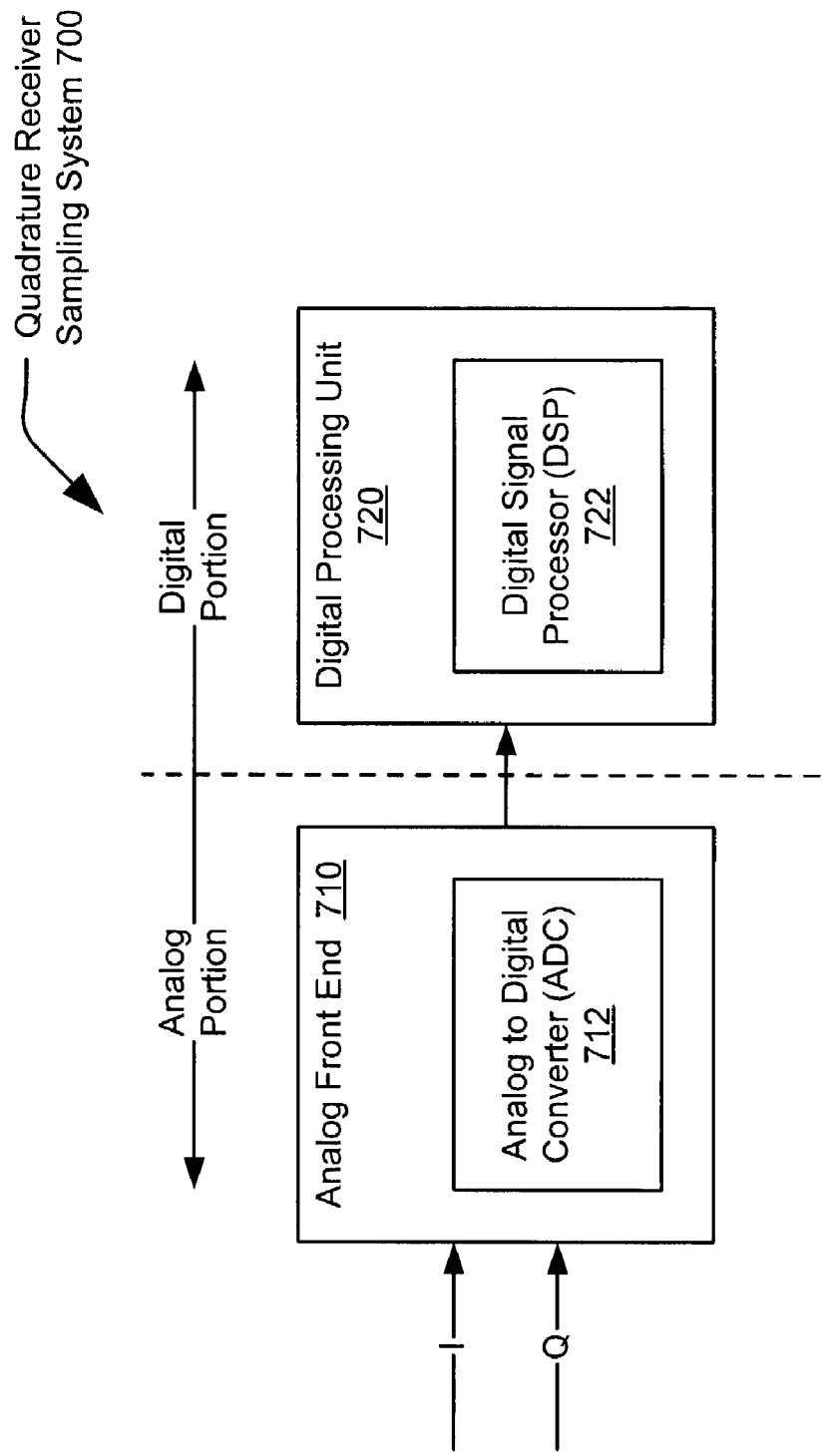
FIG. 7 is a system diagram illustrating an embodiment of a quadrature receiver sampling system that is built according to the present invention.

FIG. 7 is a system diagram illustrating an embodiment of a quadrature receiver sampling system 700 that is built according to the present invention. Analog I and Q streams are provided to an AFE 710. The AFE 710 includes a single ADC 712. The ADC 712 employs a quadrature receiver sampling architecture employed according to the present invention to perform digital sampling of the analog I and Q streams and to generate digital data corresponding to the I and Q data. The AFE 710 then provides the digital data to a DPU 720. The DPU 720 includes a DSP 722 in this implementation.

The quadrature receiver sampling system 700 may be viewed as having an analog portion and a digital portion. The architecture provided by a receiver constructed according to the present invention allows both the I and Q analog input streams to be sampled using the single ADC 712. It is again noted that in this embodiment, as well as many of the other embodiments, the I and Q analog input streams, received by the AFE 710, may be at baseband frequency. One or more other functional blocks may precede the AFE 710 to perform down-conversion of a received signal that includes both I and Q components. For example, as shown in some of the other embodiments, an RF interface (that may include a demodulator) may be employed that down-converts a received signal either directly or by using an intermediate frequency without departing from the scope and spirit of the invention.

Regardless of the manner in which the I and Q streams are extracted from a received signal, these analog I and Q data streams are provided to a the AFE 710 that is operable to support quadrature receiver sampling that is performed according to the present invention. This is also true for each of the other embodiments shown within the various Figures where I and Q streams are shown as being input to various architectures that perform quadrature receiver sampling.

Figure 8:
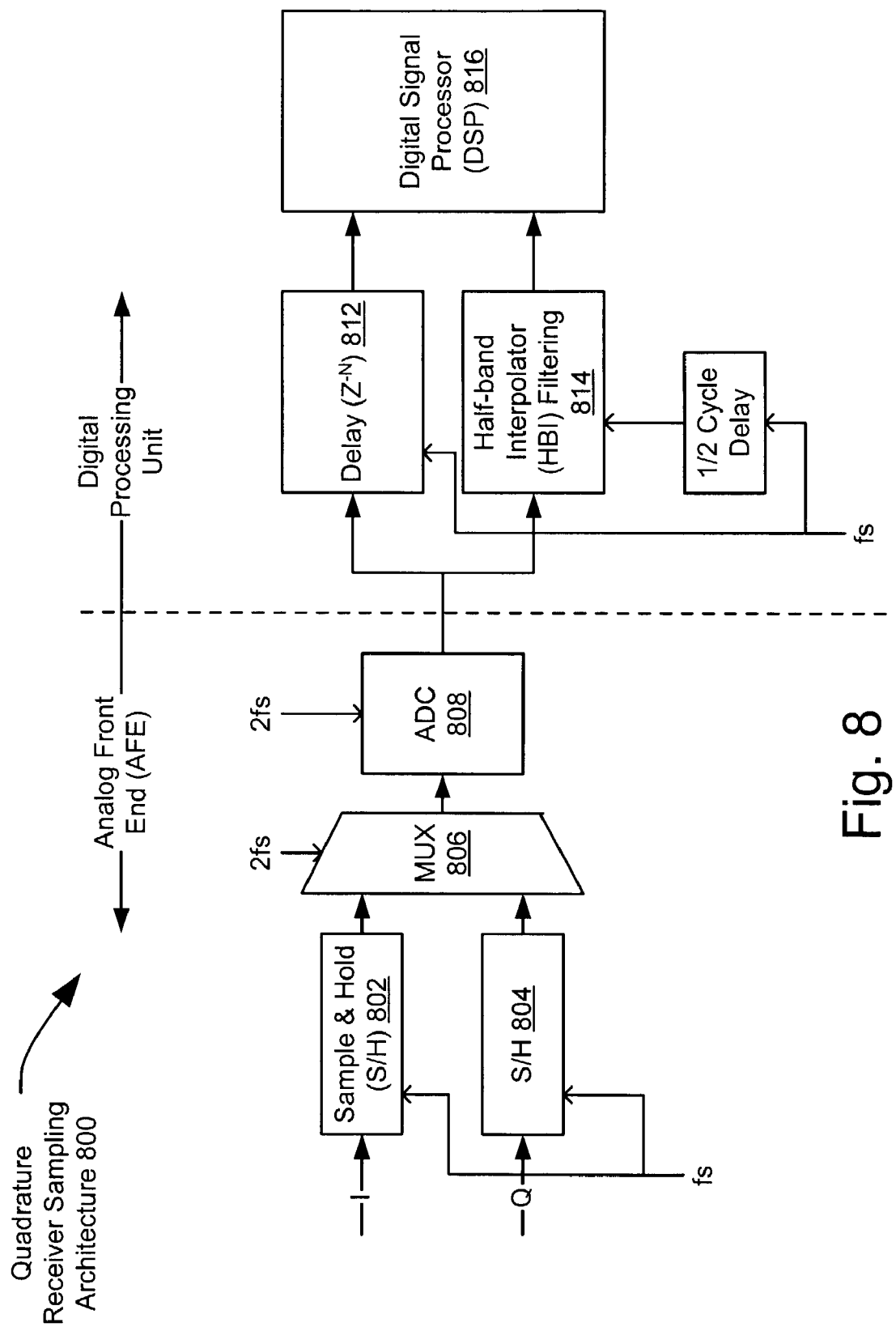
FIG. 8 is an architecture diagram illustrating an embodiment of a quadrature receiver sampling architecture that is built according to the present invention.

FIG. 8 is an architecture diagram illustrating an embodiment of a quadrature receiver sampling architecture 800 that is built according to the present invention. Analog I and Q streams are provided to sample and hold (S/H) functional block; the analog I stream is provided to a S/H 802, and the analog Q stream is provided to a S/H 804. Both the S/H 802 and the S/H 804 are clocked using a frequency fs. This frequency fs is at least twice the highest frequency component in the analog input signal I stream and the analog input signal Q stream. The S/H 802 and the S/H 804 ensure that an appropriate sample of the input analog I and Q streams may be taken later on within the quadrature receiver sampling architecture 800. The outputs of the S/H 802 and the S/H 804 are provided to a MUX 806. The selector for the MUX 806, in selecting either the output from the S/H 802 (the I stream) or the output from the S/H 804 (the Q stream) is made using the frequency 2fs. Then, alternatively and selectively, the output from the MUX 806 is provided to an ADC 808 that is also clocked at the frequency 2fs. The output of the ADC 808 will be the digital sample of either the analog input I stream or the analog input Q stream.

This output, from the ADC 808, is provided simultaneously to functional block 812 that serves as a delay element $Z(^{-N})$ and a functional block 814 that performs half-band interpolator (HBI) filtering. The functional block 812 may be viewed as including a delay that is substantially comparable to the time required to perform the HBI filtering in the functional block 814. The HBI filtering 814 may be viewed as taking two points of the received signal and calculating an intermediate value that should be truly representative of the sample of that given sample point. Both the delay element $Z(^{-N})$ 812 and the HBI filtering 814 are clocked at the frequency fs; again, the frequency fs is at least twice the frequency that includes the highest frequency component in the analog input signal I stream and the analog input signal Q stream. There is a half cycle delay between clocks for functional blocks 812 and 814. This ensures half of the data goes to functional block 812 and the another half goes to the functional block 814. The outputs of the both the delay element $Z(^{-N})$ 812 and the HBI filtering 814 are provided to a DSP 816. The DSP 816 is operable to recover transmitted symbols from the received signal. The cooperative operation of the delay element $Z(^{-N})$ 812, the HBI filtering 814, and the DSP 816 are all able to compensate for any frequency translation (rotation) that may have occurred during the analog to digital conversion and signal processing performed within the quadrature receiver sampling architecture 800. This way, the ultimate digital data will be impervious and transparent to the effects of the analog to digital sampling process.

Figure 9:
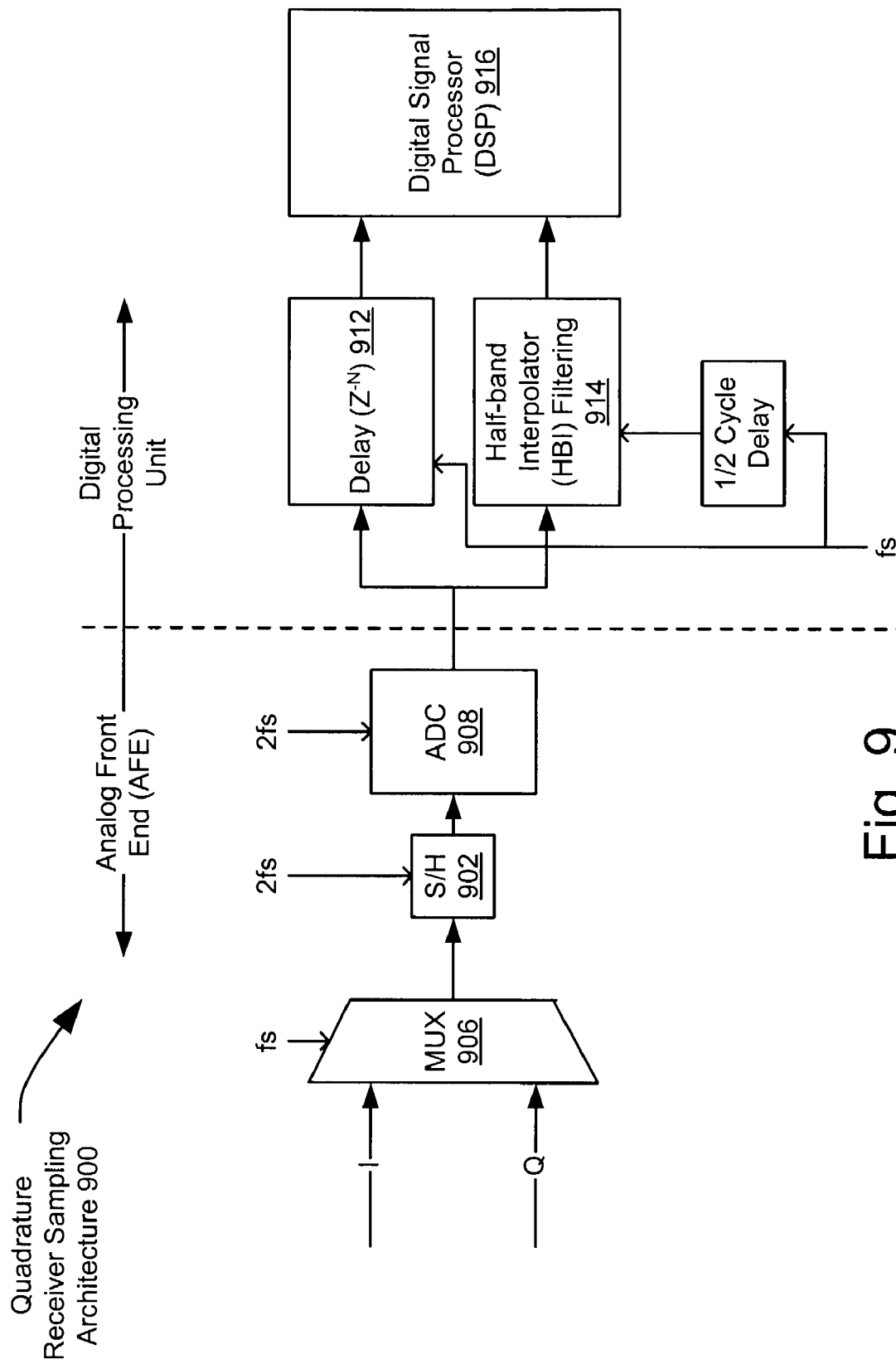
FIG. 9 is an architecture diagram illustrating another embodiment of a quadrature receiver sampling architecture that is built according to the present invention.

FIG. 9 is an architecture diagram illustrating another embodiment of a quadrature receiver sampling architecture 900 that is built according to the present invention. Analog I and Q streams are provided simultaneously to a MUX 906. The selector for the MUX 906, in selecting either the I stream or the Q stream, is made using the frequency 2fs. The frequency fs is at least twice the highest frequency component in the analog input signal I stream and the analog input signal Q stream. The output of the MUX 906, be it the output I stream or the Q stream I is provided to a S/H 902. The S/H 902 is clocked at the frequency. The S/H 902 ensures that a proper sampling of either the I or the Q stream may be performed by an ADC 908. The output of the S/H 902 is provided to the ADC 908 where it is sampled using the frequency 2fs as well.

This output, from the ADC 908, is provided simultaneously to functional block 912 that serves as a delay element $Z(^{-N})$ and a functional block 914 that performs half-band interpolator (HBI) filtering. The functional block 912 may be viewed as including a delay that is substantially comparable to the time required to perform the HBI filtering in the functional block 914. The HBI filtering 914 may be viewed as taking two points of the received signal and calculating an intermediate value that should be truly representative of the sample of that given sample point. Both the delay element $Z(^{-N})$ 912 and the HBI filtering 914 are clocked at the frequency fs; again, the frequency fs is at least twice the frequency that includes the highest frequency component in the analog input signal I stream and the analog input signal Q stream. There is a half cycle delay between clocks for functional blocks 912 and 914. This ensures half of the data goes to the functional block 912 and the another half goes to the functional block 914. The outputs of the both the delay element $Z(^{-N})$ 912 and the HBI filtering 914 are provided to a DSP 916. The DSP 916 is operable to recover transmitted symbols from the received signal. The cooperative operation of the delay element $Z(^{-N})$ 912, the HBI filtering 914, and the DSP 916 are all able to compensate for any frequency translation (rotation) that may have occurred during the analog to digital conversion and signal processing performed within the quadrature receiver sampling architecture 900. This way, the ultimate digital data will be impervious and transparent to the effects of the analog to digital sampling process that is performed using a single ADC for both I and Q streams.

Both FIGS. 8 and 9 may be viewed as including AFE portions and DPU portions; the AFE including those components and/or functional blocks before and up to the ADC, and the DPU portion includes all components and/or functional blocks after the ADC. The FIGS. 8 and 9 show the applicability of two different AFE portions that may both be used with substantially comparable DPUs in various embodiments.

Figure 10:
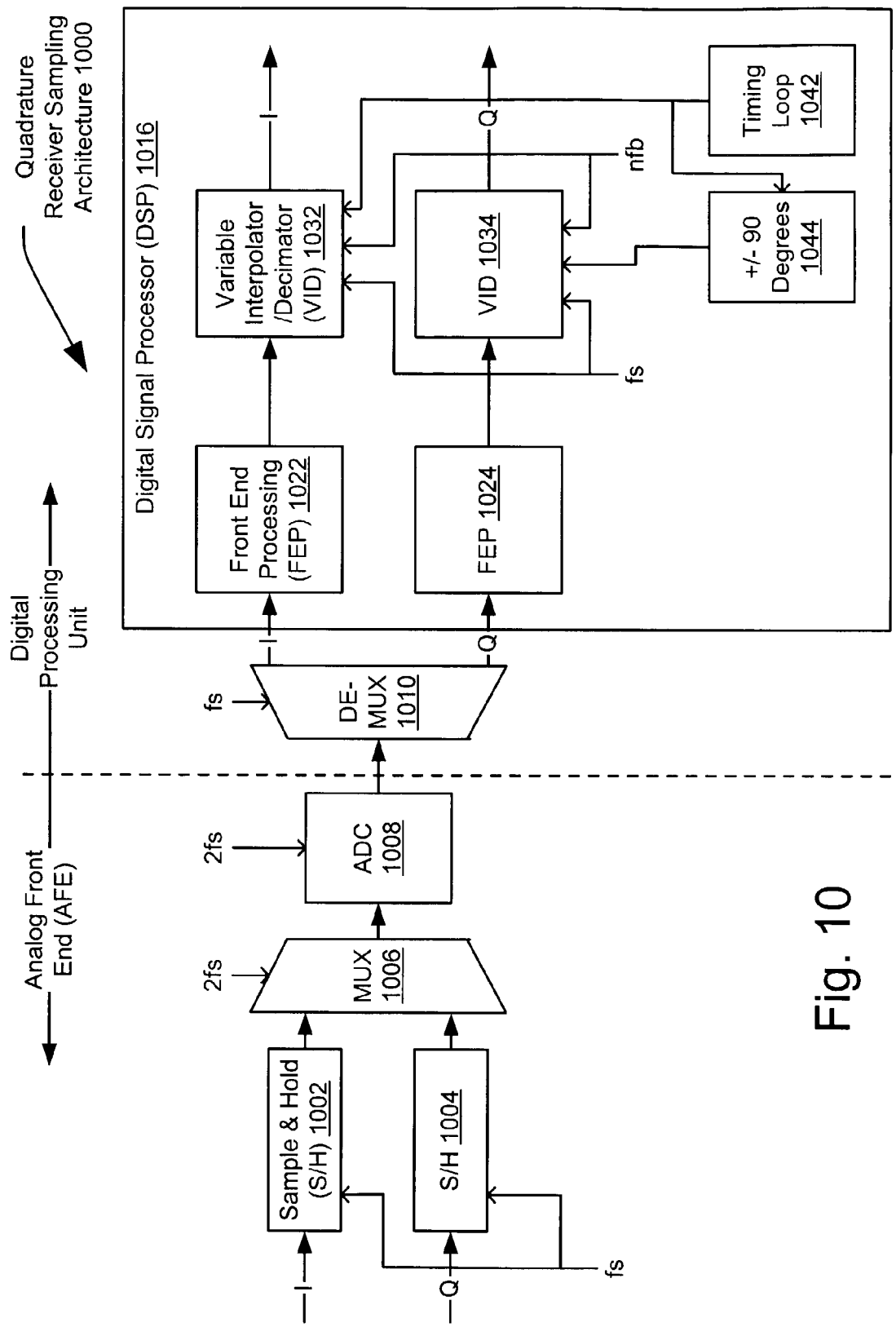
FIG. 10 is an architecture diagram illustrating another embodiment of a quadrature receiver sampling architecture that is built according to the present invention.

FIG. 10 is an architecture diagram illustrating another embodiment of a quadrature receiver sampling architecture that is built according to the present invention. Analog I and Q streams are provided to sample and hold (S/H) functional blocks; the analog I stream is provided to a S/H 1002, and the analog Q stream is provided to a S/H 1004. Both the S/H 1002 and the S/H 1004 are clocked using a frequency fs. This frequency is at least twice the frequency that includes the highest frequency component in the analog input signal I stream and the analog input signal Q stream. The S/H 1002 and the S/H 1004 ensure that an appropriate sample of the input analog I and Q streams may be taken later on within the quadrature receiver sampling architecture 1000. The outputs of the S/H 1002 and the S/H 1004 are provided to a MUX 1006. The selector for the MUX 1006, in selecting either the output from the S/H 1002 (the I stream) or the output from the S/H 1004 (the Q stream) is made using the frequency 2fs. This frequency 2fs may be viewed as being twice the highest frequency component in the analog input signal I stream and the analog input signal Q stream. Then, alternatively and selectively, the output from the MUX 1006 is provided to an ADC 1008 that is also clocked at the frequency 2fs. The output of the ADC 1008 will be the digital sample of either the analog input I stream or the analog input Q stream.

The output of the ADC 1008 is provided to a de-multiplexor (DE-MUX) 1010 that is clocked at the frequency fs. Again, the frequency fs is at least twice the frequency that includes the highest frequency component in the analog input signal I stream and the analog input signal Q stream. The I stream and Q stream, now in digital format, may then be de-multiplexed and provided to a DSP 1016. The DSP 1016 may perform a variety of mathematical operations on the now digital forms of the I and Q streams. Each of the now-digital I and Q streams are provided to front-end processing (FEP) functional blocks. These FEPs 1022 and 1024 may be viewed as mathematical operations within the DSP 1016. The FEPs 1022 and 1024 may include various functional operations including gain adjustment and/or scaling.

The outputs of the FEPs 1022 are provided to functional blocks that are operable to perform variable interpolation/decimation (VIDs) 1032 and 1034; for example, the output of the FEP 1022 is provided to the VID 1032, and the output of the FEP 1024 is provided to the VID 1034. The VIDs 1032 and 1034 are operable to perform down-conversion from the received frequency fs to any multiple of the symbol frequency fib. The frequency fb is the symbol frequency of the received I and Q streams received by the S/H 1002 and 1004. In one instance, the VIDs 1032 and 1034 may down-convert to any multiple of the symbol frequency, generically up to nfb (where n is a positive integer). In addition, a timing loop 1042 and a functional block 1044 that is operable to perform ±90 degrees translation operate cooperatively to compensate for any delay that may have occurred during the analog to digital conversion and signal processing performed within the quadrature receiver sampling architecture 1000. The timing loop 1042 is operable to tell where the sample is with respect to a reference phase; the timing loop 1042 may be viewed as including a phase detector. This way, the ultimate digital data will be impervious and transparent to the effects of the analog to digital sampling process that is performed using a single ADC for both I and Q streams. The various functional blocks shown within the DSP 1016 may be viewed being mathematical manipulation and/or operation.

Figure 11:
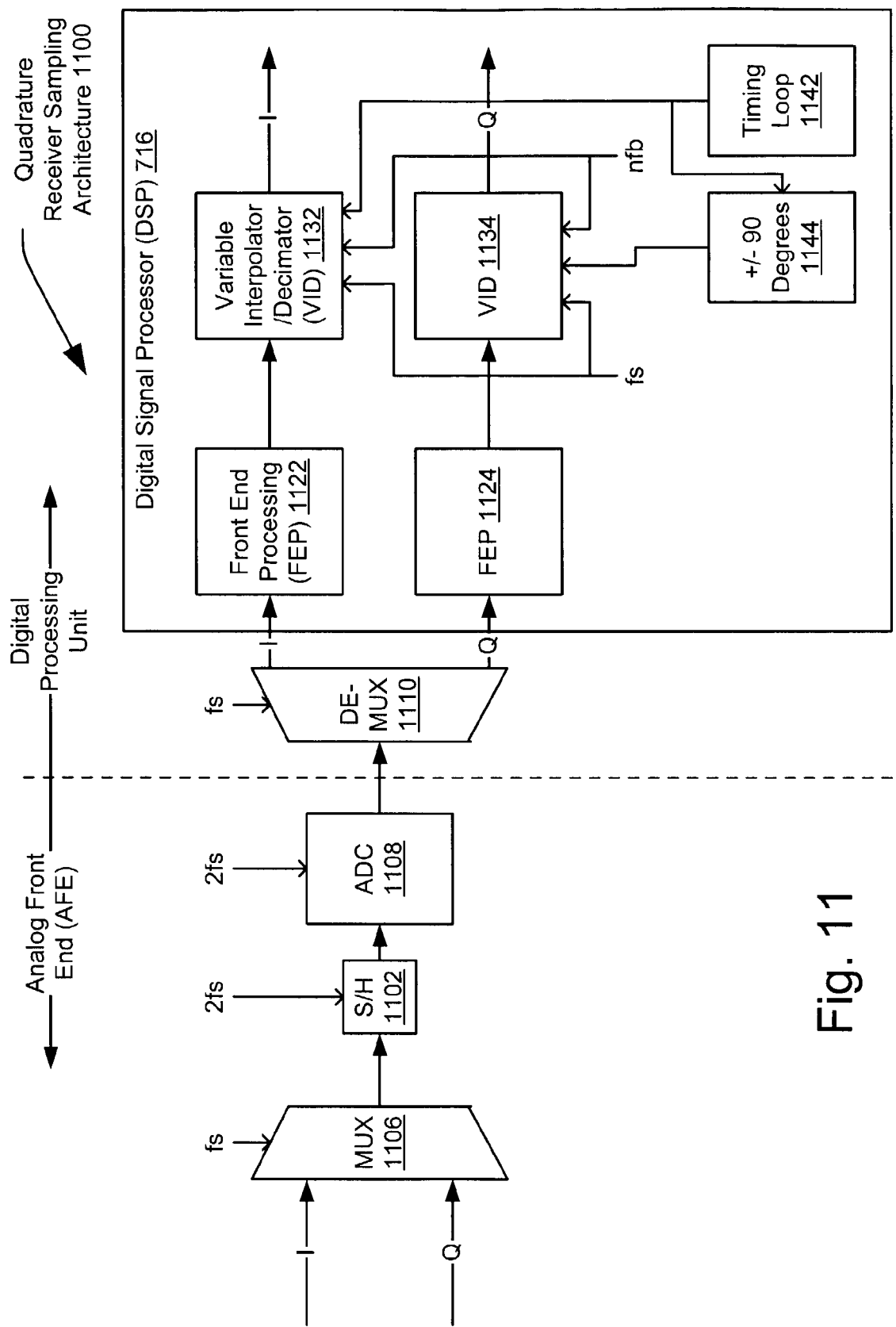
FIG. 11 is an architecture diagram illustrating another embodiment of a quadrature receiver sampling architecture that is built according to the present invention.

FIG. 11 is an architecture diagram illustrating another embodiment of a quadrature receiver sampling architecture that is built according to the present invention. Analog I and Q streams are provided simultaneously to a MUX 1106. The selector for the MUX 1106, in selecting either the I stream or the Q stream, is made using the frequency 2fs. This frequency fs is at least twice the highest frequency component in the analog input signal I stream and the analog input signal Q stream. The output of the MUX 1106, be it the output I stream or the Q stream I is provided to a S/H 1102. The S/H 1102 is clocked at the frequency 2fs. The S/H 1102 ensures that a proper sampling of either the I or the Q stream may be performed by an ADC 1108. The output of the S/H 1102 is provided to the ADC 1108 where it is sampled using the frequency 2fs as well.

The output of the ADC 1108 is provided to a de-multiplexor (DE-MUX) 1110 that is clocked at the frequency fs. Again, the frequency fs is at least twice the frequency that includes the highest frequency component in the analog input signal I stream and the analog input signal Q stream. The I stream and Q stream, now in digital format, may then be de-multiplexed and provided to a DSP 1116. The DSP 1116 may perform a variety of mathematical operations on the now digital forms of the I and Q streams. Each of the now-digital I and Q streams are provided to front-end processing (FEP) functional blocks. These FEPs 1122 and 1124 may be viewed as mathematical operations within the DSP 1116. The FEPs 1122 and 1124 may include various functional operations including gain adjustment and/or scaling.

The outputs of the FEPs 1122 are provided to functional blocks that are operable to perform variable interpolation/decimation (VIDs) 1132 and 1134; for example, the output of the FEP 1122 is provided to the VID 1132, and the output of the FEP 1124 is provided to the VID 1134. The VIDs 1132 and 1134 are operable to perform down-conversion from the received frequency fs to any multiple of the frequency fb. The frequency fb is the symbol frequency of the received I and Q streams received by the S/H 1102 and 1104. In one instance, the VIDs 1132 and 1134 may down-convert to any multiple of the symbol frequency, generically up to nfb (where n is a positive integer). In addition, a timing loop 1142 and a functional block 1144 that is operable to perform ±190 degrees translation operate cooperatively to compensate for any delay that may have occurred during the analog to digital conversion and signal processing performed within the quadrature receiver sampling architecture 1100. The timing loop 1142 is operable to tell where the sample is with respect to a reference phase; the timing loop 1142 may be viewed as including a phase detector. This way, the ultimate digital data will be impervious and transparent to the effects of the analog to digital sampling process that is performed using a single ADC for both I and Q streams. The various functional blocks shown within the DSP 1116 may be viewed being mathematical manipulation and/or operation.

Both FIGS. 10 and 11 may be viewed as including AFE portions and DPU portions; the AFE including those components and/or functional blocks before and up to the ADC, and the DPU portion includes all components and/or functional blocks after the ADC. The FIGS. 10 and 11 show the applicability of two substantially comparable AFE portions that may both be used with two different DPUs in various embodiments.

Figure 12:
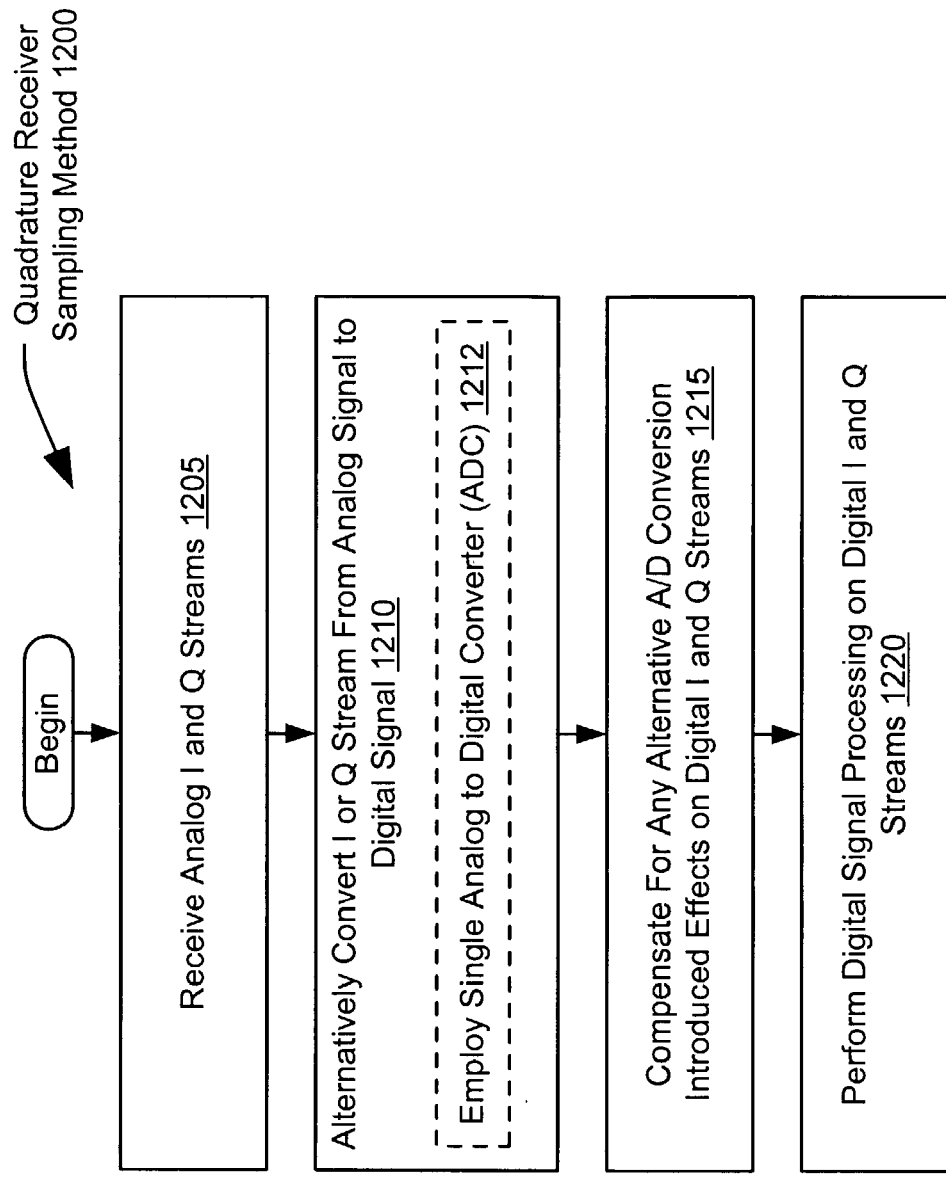
FIG. 12 is a flow diagram illustrating an embodiment of a quadrature receiver sampling method that is performed according to the present invention.

FIG. 12 is a flow diagram illustrating an embodiment of a quadrature receiver sampling method 1200 that is performed according to the present invention. In a block 1205, analog I and Q streams are received. In a block 1210, the I and Q streams are alternatively converted from analog signals into digital signals. In certain embodiments, a single ADC is employed to perform the alternative analog to digital conversion as shown in a block 1212.

Then, as shown in a block 1215, any undesirable effects introduced into the now-digital I and Q streams, introduced by the alternative analog to digital conversion, are compensated. This may include compensating for any delay introduced by the alternative digital sampling of the I and Q streams using a single ADC. In a block 1220, any subsequent digital signal processing is performed on the digital I and Q streams. The operations performed within the quadrature receiver sampling method 1200 may be viewed as being bifurcated into analog processing and digital processing; for example, the blocks 1205 and 1210 may be viewed as being analog processing, and the blocks 1215 and 1220 may be viewed as being digital processing.

Figure 13:
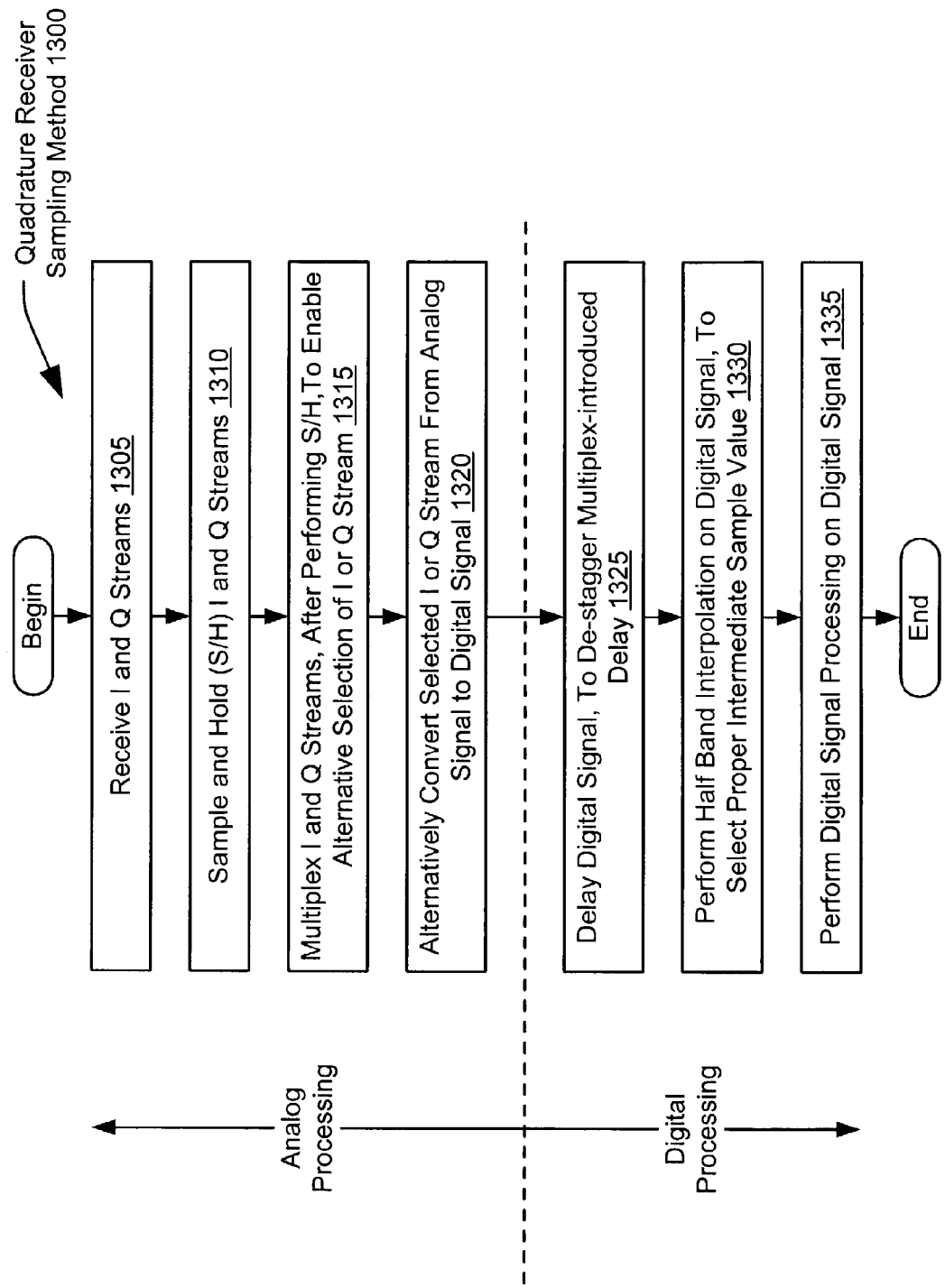
FIG. 13 is a flow diagram illustrating another embodiment of a quadrature receiver sampling method that is performed according to the present invention.

FIG. 13 is a flow diagram illustrating another embodiment of a quadrature receiver sampling method 1300 that is performed according to the present invention. I and Q analog streams are received in a block 1305. Then, S/H operations are performed on both the I and Q streams in a block 1310. These I and Q streams, after having undergone the S/H operations, are then multiplexed to enable alternative selection of the I and Q streams in a block 1315 in a block 1320, the selected I and Q streams are alternatively converted from analog signals to digital signals. This analog to digital conversion may be performed using a single ADC according to the present invention. The operations described above may be viewed as being the analog processing within the quadrature receiver sampling method 1300, namely, the operations within the blocks 1305, 1310, 1315, and 1320.

In a block 1325, the digital signal is delayed to de-stagger any MUX-introduced delay. Then, in a block 1330, half band interpolation is performed on the digital signal to select a proper intermediate value for use in subsequent digital signal processing operations. Then, in a block 1335, any subsequent digital signal processing is performed on the digital signal. The operations shown within the blocks 1325, 1330, and 1335 may be performed on both the I and Q digital data streams. The operations described above may be viewed as being the digital processing within the quadrature receiver sampling method 1300, namely, the operations within the blocks 1325, 1330, and 1335.

Figure 14:
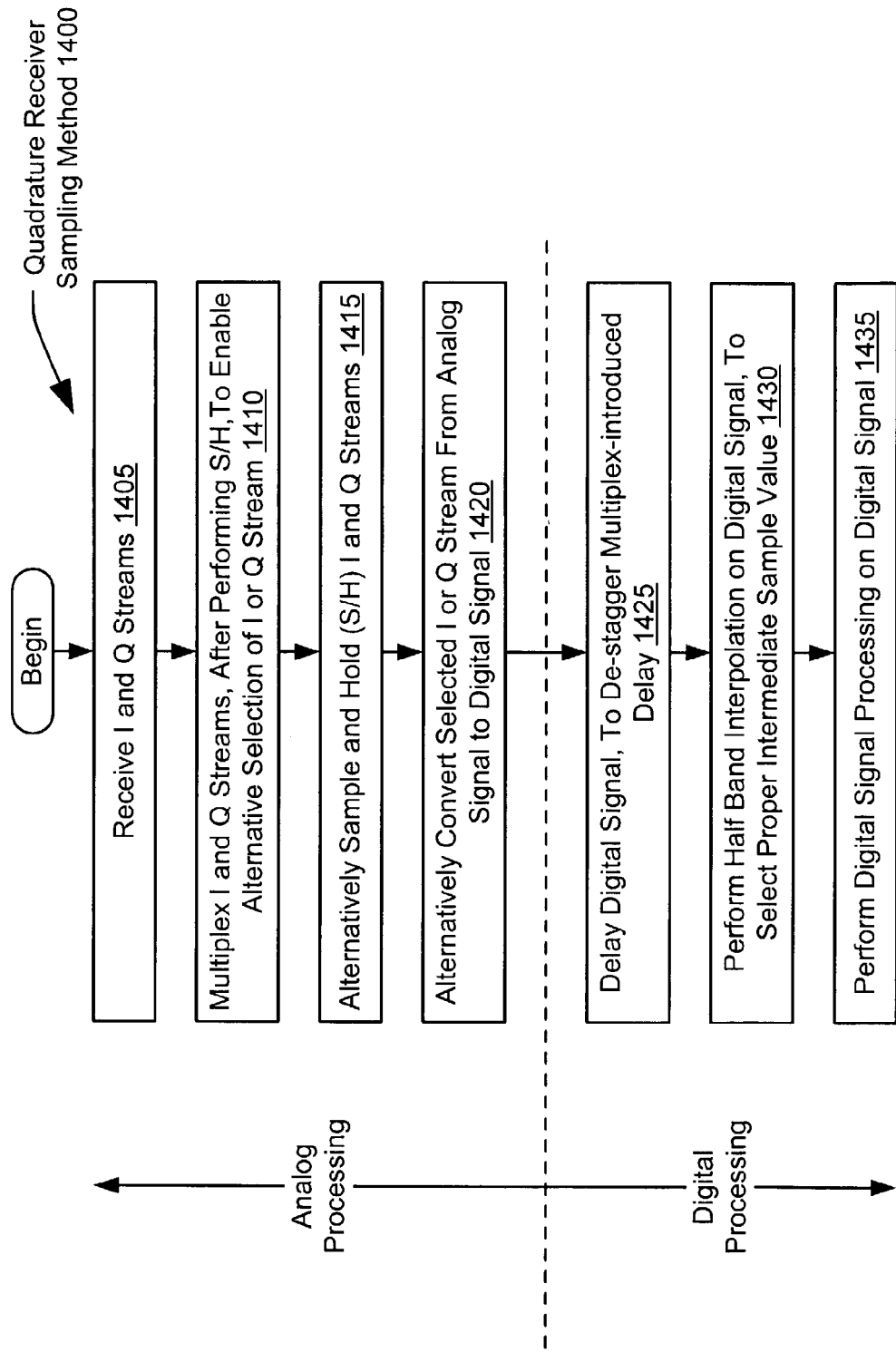
FIG. 14 is a flow diagram illustrating another embodiment of a quadrature receiver sampling method that is performed according to the present invention.

FIG. 14 is a flow diagram illustrating another embodiment of a quadrature receiver sampling method 1400 that is performed according to the present invention. I and Q analog streams are received in a block 1405. These received I and Q streams are multiplexed to enable alternative selection of the I and Q streams in a block 1410. S/H operations are alternatively performed on the I and Q streams in a block 1415. The selected and sampled and held I and Q stream is alternatively converted from an analog signal to digital signal. This analog to digital conversion may be performed using a single ADC according to the present invention. The operations described above may be viewed as being the analog processing within the quadrature receiver sampling method 1400, namely, the operations within the blocks 1405, 1410, 1415, and 1420.

In a block 1425, the digital signal is delayed to de-stagger any MUX-introduced delay. Then, in a block 1430, half band interpolation is performed on the digital signal to select a proper intermediate value for use in subsequent digital signal processing operations. Then, in a block 1435, any subsequent digital signal processing is performed on the digital signal. The operations shown within the blocks 1425, 1430, and 1435 may be performed on both the I and Q digital data streams. The operations described above may be viewed as being the digital processing within the quadrature receiver sampling method 1400, namely, the operations within the blocks 1425, 1430, and 1435.

Figure 15:
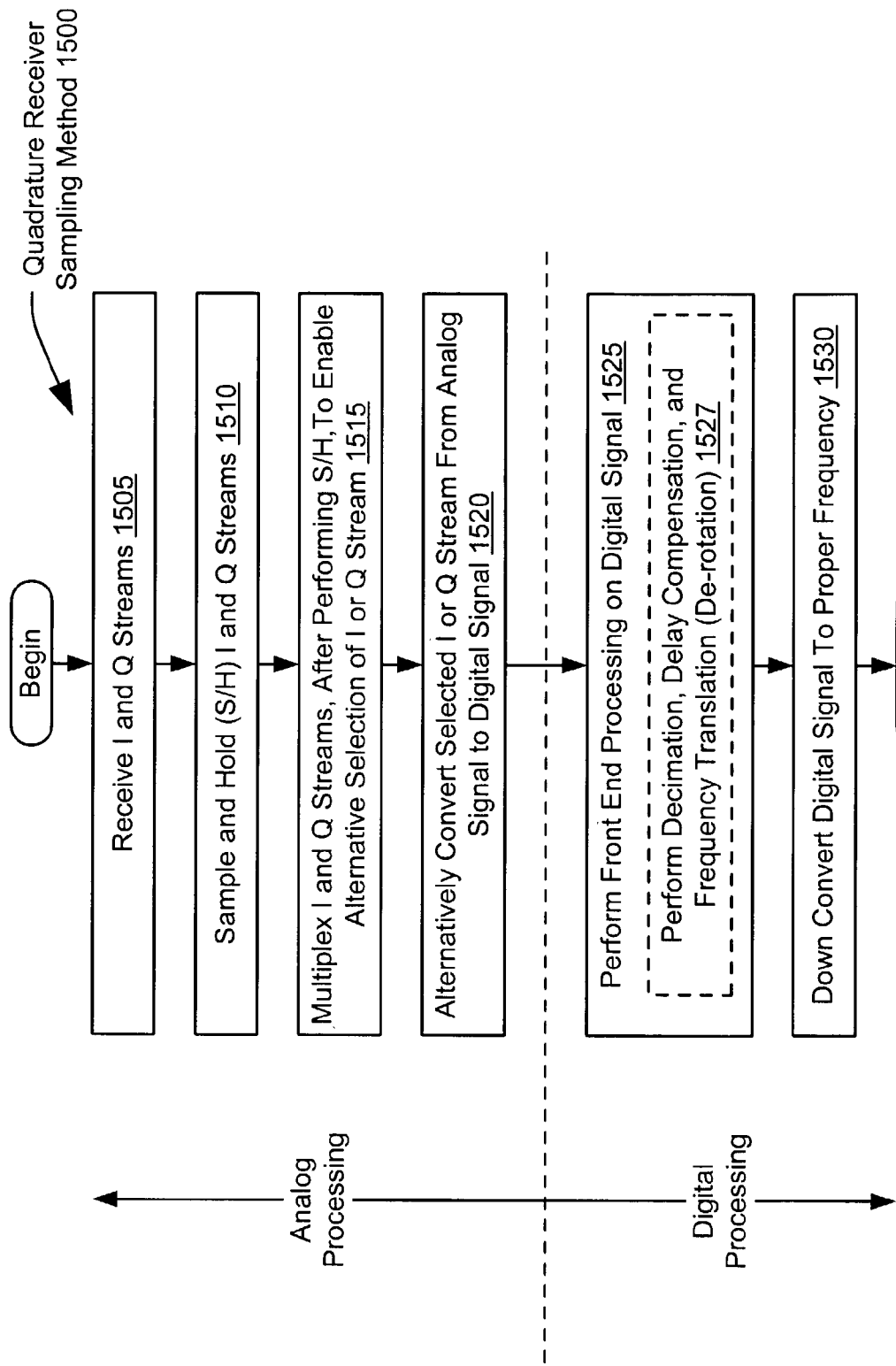
FIG. 15 is a flow diagram illustrating another embodiment of a quadrature receiver sampling method that is performed according to the present invention.

FIG. 15 is a flow diagram illustrating another embodiment of a quadrature receiver sampling method 1500 that is performed according to the present invention. I and Q analog streams are received in a block 1505. Then, S/H operations are performed on both the I and Q streams in a block 1510. These I and Q streams, after having undergone the S/H operations, are then multiplexed to enable alternative selection of the I and Q streams in a block 1515 in a block 1520, the selected I and Q streams are alternatively converted from analog signals to digital signals. This analog to digital conversion may be performed using a single ADC according to the present invention. The operations described above may be viewed as being the analog processing within the quadrature receiver sampling method 1500, namely, the operations within the blocks 1505, 1510, 1515, and 1520.

In a block 1525, front end processing is performed on the received digital signal. This may include performing decimation, delay compensation, and frequency translation (de-rotation) on the digital signal as shown in a block 1527. In addition, any frequency conversion of the digital signal may be performed as shown in a block 1530. This frequency conversion in the block 1530 may include down-converting from the sample frequency to any multiple of the symbol frequency.

Figure 16:
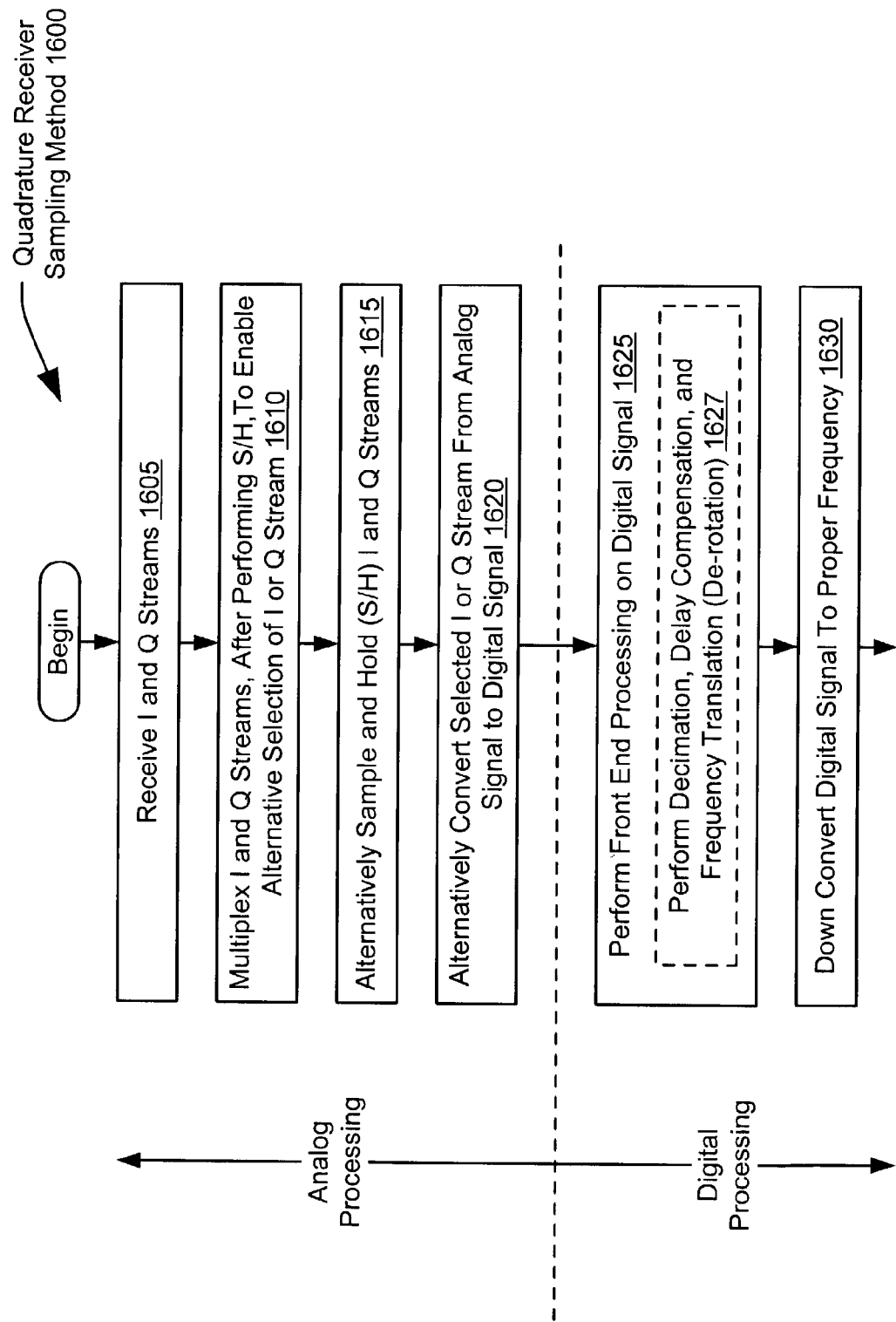
FIG. 16 is a flow diagram illustrating another embodiment of a quadrature receiver sampling method that is performed according to the present invention.

FIG. 16 is a flow diagram illustrating another embodiment of a quadrature receiver sampling method 1600 that is performed according to the present invention. I and Q analog streams are received in a block 1605. These received I and Q streams are multiplexed to enable alternative selection of the I and Q streams in a block 1610. S/H operations are alternatively performed on the I and Q streams in a block 1615. The selected and sampled and held I and Q streams are alternatively converted from an analog signal to digital signal. This analog to digital conversion may be performed using a single ADC according to the present invention. The operations described above may be viewed as being the analog processing within the quadrature receiver sampling method 1600, namely, the operations within the blocks 1605, 1610, 1615, and 1620.

In a block 1625, front end processing is performed on the received digital signal. This may include performing decimation, delay compensation, and frequency translation (de-rotation) on the digital signal as shown in a block 1627. In addition, any frequency conversion of the digital signal may be performed as shown in a block 1630. This frequency conversion in the block 1630 may include down-converting from the sampling frequency to any multiple of the symbol frequency.

It is also noted that the functionality, operations, and systems described above, in supporting quadrature receiver sampling may also benefit by using the functionality and operations described within the U.S. Provisional Patent Application Ser. No. 60/381,496, entitled "SAMPLE RATE REDUCTION IN DATA COMMUNICATION RECEIVERS,", filed May 17, 2002, that has above been incorporated by reference in its entirety and made part of the present U.S. Patent Application for all purposes. For example, any of the embodiments that perform analog to digital conversion of I and Q streams, or any single data streams as well, may employ one or more of the various embodiments to the sample rate reduction systems and methods described therein.

In view of the above detailed description of the invention and associated drawings, other modifications and variations will now become apparent. It should also be apparent that such other modifications and variations may be effected without departing from the spirit and scope of the invention.

What is claimed is:

1. A communication receiver, comprising:
   an analog front-end that is operable to receive an analog I stream and an analog Q stream;
   a digital processing unit that is communicatively coupled to the analog front-end;
   wherein the analog front-end includes a multiplexor and a single analog to digital convener that operate cooperatively to perform alternative digital sampling of the analog I stream and the analog Q stream thereby convening the analog I stream and the analog Q stream into a digital I stream and a digital Q stream; and
   the digital processing unit is operable to perform decimation and de-rotation of a digital sample of the digital I stream and the digital Q stream, the rotation being introduced during the analog to digital conversion of the analog I stream and the analog Q stream, the digital processing unit includes a digital signal processor, wherein the digital signal processor performs mathematical operations on the digital I stream and the digital Q stream to compensate for delay that occurs during the analog to digital conversion of the analog I stream and the analog Q stream thereby performing the de-rotation of the digital sample of the digital I stream and the digital Q stream.

2. The communication receiver of claim 1, further comprising a radio frequency interface that is operable to extract the analog I stream and the analog Q stream from a received analog signal.

3. The communication receiver of claim 1, wherein a selector of the multiplexor and the single analog to digital convener being clocked at a frequency that is substantially twice a digital sampling frequency of the analog I stream and the analog Q stream.

4. The communication receiver of claim 1, wherein a selector of the multiplexor being clocked a first frequency that is substantially twice a digital sampling frequency of the analog I stream and the analog Q stream; and
   the single analog to digital convener being clocked at a second frequency that is substantially twice the digital sampling frequency of the analog I stream and the analog Q stream.

5. The communication receiver of claim 1, wherein the analog front-end further comprises a sample and hold element that is communicatively coupled to the multiplexor.

6. The communication receiver of claim 5, wherein the analog I stream and the analog Q stream are provided to the multiplexor;
   an output of the multiplexor is provided to the sample and hold element; and
   an output of the sample and hold element is provided to the single analog to digital converter.

7. The communication receiver of claim 5, wherein the analog front-end further comprises at least one additional sample and hold element; and
   wherein the analog I stream is provided to the sample and hold element;
   the analog Q stream is provided to the at least one additional sample and hold element;
   outputs from the sample and hold element and the at least one additional sample and hold element are provided to the multiplexor; and
   an output of the multiplexor is provided to the single analog to digital converter.

8. The communication receiver of claim 1, wherein the communication receiver comprises at least one of a base station receiver, a mobile receiver, a set top box, a tower receiver, a mobile unit, and an high definition television (HDTV) set top box receiver.

9. The communication receiver of claim 8, wherein at least one of the base station receiver and the tower receiver comprises a wireless tower.

10. The communication receiver of claim 8, wherein at least one of the set top box and the HDTV set top box receiver comprises a local satellite dish.

11. The communication receiver of claim 1, wherein the communication receiver is contained within a transceiver, the transceiver also comprises a communication transmitter.

12. The communication receiver of claim 2, wherein the analog signal is received via a wireless communication channel.

13. A satellite communication system, comprising:
a local satellite dish that is operable to receive an analog signal transmitted from a satellite via a wireless communication channel; and
a set top box, communicatively coupled to the local satellite dish via a coaxial cable, that receives the analog signal received by the local satellite dish;
wherein the set top box includes an analog front-end and a digital processing unit, the analog front-end includes a radio frequency interface;
the analog front-end is operable to receive the analog signal transmitted from the satellite and to extract an analog I stream and an analog Q stream therefrom;
the digital processing unit is communicatively coupled to the analog front-end;
the analog front-end includes a multiplexor and a single analog to digital converter that operate cooperatively to perform alternative digital sampling of the analog I stream and the analog Q stream thereby converting the analog I stream and the analog Q stream into a digital I stream and a digital Q stream; and
the digital processing unit is operable to perform decimation and de-rotation of a digital sample of the digital I stream and the digital Q stream, the rotation being introduced during the analog to digital conversion of the analog I stream and the analog Q stream; wherein the digital processing unit includes:
a digital signal processor, a delay element, and a half band interpolating filter;
the delay provided by the delay element is substantially comparable to a time comprises a duration that is substantially comparable to a time required to perform a half band interpolating filtering; and
wherein the delay element and the half band interpolating filter operate cooperatively to compensate for delay that occurs during the analog to digital conversion of the analog I stream and the analog Q stream thereby performing the de-rotation of the digital sample of the digital I stream and the digital Q stream.

14. The satellite communication system of claim 13, wherein the analog front-end further comprises a radio frequency interface that is operable to extract the analog I stream and the analog Q stream from the received analog signal.

15. The satellite communication system of claim 13, wherein the analog front-end further comprises a sample and hold element that is communicatively coupled to the multiplexor.

16. A communication receiver, comprising:
an analog front-end that is operable to receive an analog I stream and an analog Q stream;
a digital processing unit that is communicatively coupled to the analog front-end;
wherein the analog front-end includes a multiplexor and a single analog to digital convener that operate cooperatively to perform alternative digital sampling of the analog I stream and the analog Q stream thereby convening the analog I stream and the analog Q stream into a digital I stream and a digital Q stream; and
the digital processing unit is operable to perform decimation and de-rotation of a digital sample of the digital I stream and the digital Q stream, the rotation being introduced during the analog to digital conversion of the analog I stream and the analog Q stream, wherein the digital processing unit includes:
a digital signal processor, a delay element, and the half band interpolating filter;
the delay provided by the delay element is substantially comparable to a time includes a duration that is substantially comparable to a time required to perform the half band interpolating filtering; and
wherein the delay element and the half band interpolating filter operate cooperatively to compensate for any delay that occurs during the analog to digital conversion of the analog I stream and the analog Q stream thereby performing the de-rotation of the digital sample of the digital I stream and the digital Q stream.

17. The communication receiver of claim 16, further comprising a radio frequency interface that is operable to extract the analog I stream and the analog Q stream from a received analog signal.

18. The communication receiver of claim 16, wherein a selector of the multiplexor and the single analog to digital convener being clocked at a frequency that is substantially twice a digital sampling frequency of the analog I stream and the analog Q stream.

19. The communication receiver of claim 16, wherein a selector of the multiplexor being clocked a first frequency that is substantially twice a digital sampling frequency of the analog I stream and the analog Q stream; and
the single analog to digital convener being clocked at a second frequency that is substantially twice the digital sampling frequency of the analog I stream and the analog Q stream.

20. The communication receiver of claim 16, wherein the analog front-end further comprises a sample and hold element that is communicatively coupled to the multiplexor.

21. The communication receiver of claim 20, wherein the analog I stream and the analog Q stream are provided to the multiplexor;
an output of the multiplexor is provided to the sample and hold element; and
an output of the sample and hold element is provided to the single analog to digital converter.

22. The communication receiver of claim 20, wherein the analog front-end further comprises at least one additional sample and hold element; and
wherein the analog I stream is provided to the sample and hold element;
the analog Q stream is provided to the at least one additional sample and hold element;
outputs from the sample and hold element and the at least one additional sample and hold element are provided to the multiplexor; and
an output of the multiplexor is provided to the single analog to digital converter.

23. The communication receiver of claim 16, wherein the communication receiver comprises at least one of a base station receiver, a mobile receiver, a set top box, a tower receiver, a mobile unit, and an high definition television (HDTV) set top box receiver.

24. The communication receiver of claim 23, wherein at least one of the base station receiver and the tower receiver comprises a wireless tower.

25. The communication receiver of claim 23, wherein at least one of the set top box and the HDTV set top box receiver comprises a local satellite dish.

26. The communication receiver of claim 16, wherein the communication receiver is contained within a transceiver, the transceiver also comprises a communication transmitter.

27. The communication receiver of claim 17, wherein the analog signal is received via a wireless communication channel.

* * * * *

UNITED STATES PATENT AND TRADEMARK OFFICE
CERTIFICATE OF CORRECTION

| | | |
|---|---|---|
| PATENT NO. | : 7,139,332 B2 | Page 1 of 1 |
| APPLICATION NO. | : 10/184766 | |
| DATED | : November 21, 2006 | |
| INVENTOR(S) | : Tommy Yu et al. | |

It is certified that error appears in the above-identified patent and that said Letters Patent is hereby corrected as shown below:

Column 16, line 28, in Claim 3: replace "convener" with --converter--

Column 18, line 2, in Claim 16: replace "convener" with --converter--

Column 18, line 5, in Claim 16: replace "convening" with --converting--

Column 18, line 32, Claim 18: replace "convener" with --converter--

Signed and Sealed this

Tenth Day of June, 2008

JON W. DUDAS
*Director of the United States Patent and Trademark Office*